US010791289B2

(12) United States Patent
Maruyama et al.

(10) Patent No.: US 10,791,289 B2
(45) Date of Patent: Sep. 29, 2020

(54) IMAGE PROCESSING APPARATUS, IMAGE PROCESSING METHOD, AND NON-TRANSITORY COMPUTER READABLE RECORDING MEDIUM

(71) Applicant: OLYMPUS CORPORATION, Tokyo (JP)

(72) Inventors: Hiroki Maruyama, Tokyo (JP); Manabu Ichikawa, Tokyo (JP); Teruaki Yamasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 3 days.

(21) Appl. No.: 16/249,239

(22) Filed: Jan. 16, 2019

(65) Prior Publication Data

US 2019/0166320 A1    May 30, 2019

Related U.S. Application Data

(63) Continuation of application No. PCT/JP2016/072445, filed on Jul. 29, 2016.

(51) Int. Cl.
*H04N 5/367* (2011.01)

(52) U.S. Cl.
CPC .................. *H04N 5/367* (2013.01)

(58) Field of Classification Search
CPC ............... H04N 5/3675; H04N 5/378
See application file for complete search history.

(56) References Cited

U.S. PATENT DOCUMENTS

2008/0049125 A1* 2/2008 Subbotin .............. H04N 5/3675
348/241
2008/0100728 A1    5/2008 Nagata
(Continued)

FOREIGN PATENT DOCUMENTS

| JP | 2008-109504 A | 5/2008 |
| JP | 4453332 B2 | 4/2010 |
| WO | 2013/154105 A1 | 10/2013 |

OTHER PUBLICATIONS

English abstract only of JP 2005-123946.
International Search Report dated Oct. 11, 2016 received in PCT/JP2016/072445.

*Primary Examiner* — Timothy J Henn
(74) *Attorney, Agent, or Firm* — Scully, Scott, Murphy & Presser, P.C.

(57) ABSTRACT

An image processing apparatus processes noise from a defective pixel in image data generated by an image sensor including plural pixels, and plural read-out circuits that read out the signal. The apparatus includes an acquisition unit that obtains the image data and position information of the defective pixel; a defective pixel correction unit that corrects the signal from the defective pixel included in the image data, based on the position information; a low saturation pixel correction unit that corrects a signal from a low saturation pixel included in the image data where the signal from the defective pixel has been corrected, the low saturation pixel having a saturation level lower than the other pixels, based on a preliminarily calculated saturation level of the plural pixels; and a saturation level calculation unit that calculates the saturation level of the defective pixel corrected by the defective pixel correction unit.

13 Claims, 17 Drawing Sheets

(56) References Cited

U.S. PATENT DOCUMENTS

| | | | |
|---|---|---|---|
| 2011/0049374 A1* | 3/2011 | Omi | G09G 3/006 |
| | | | 250/370.08 |
| 2012/0294527 A1* | 11/2012 | Lukac | G06K 9/40 |
| | | | 382/167 |
| 2014/0211048 A1* | 7/2014 | Kolli | H04N 5/367 |
| | | | 348/246 |
| 2014/0211049 A1 | 7/2014 | Tsutsui et al. | |
| 2019/0174081 A1* | 6/2019 | Maruyama | H04N 5/357 |

* cited by examiner

| | |
|---|---|
| 0 | 3950 |
| 1 | (5,4)=3000 |
| 2 | (4,6)=2500 |
| 3 | |
| 4 | |
| 5 | |
| 6 | |
| 7 | |
| 8 | |
| 9 | |

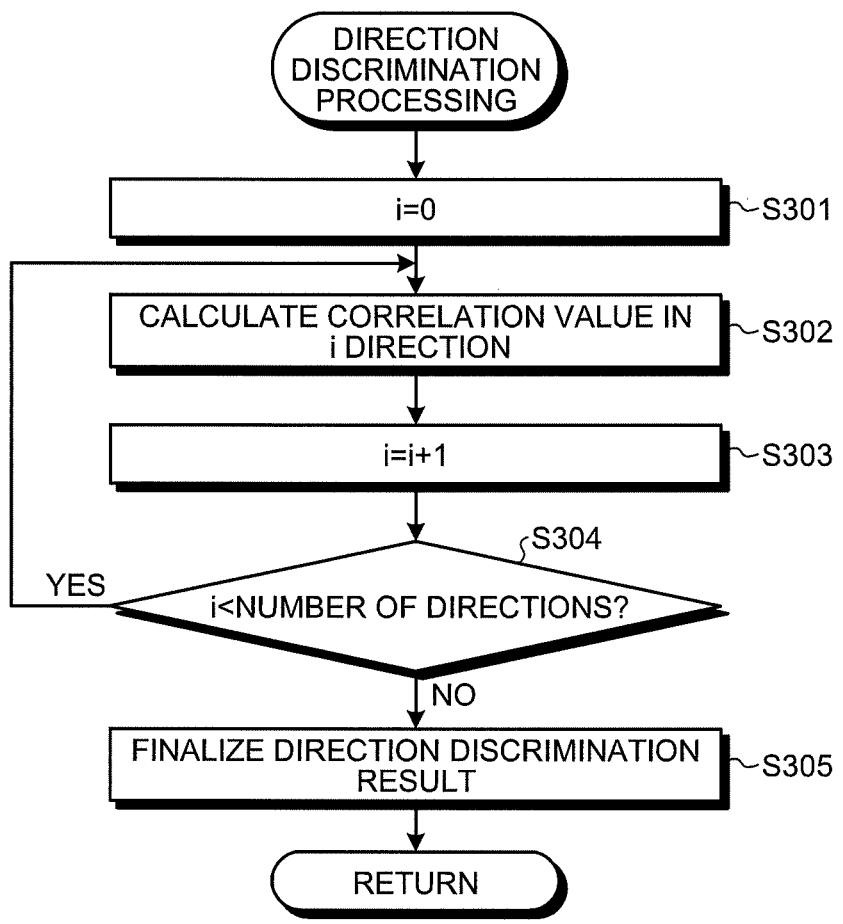

|   |   |   |   |   |   |   |   |   |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 1 | 0 | 1 | 0 | ⊠ | 0 | 1 | 0 | 1 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

|   |   |   |   |   |   |   |   |   |
|---|---|---|---|---|---|---|---|---|
| 1 | 0 | 0 | 0 | 0 | 0 | 0 | 0 | 0 |
| 0 | 0 | 0 | 0 | 0 | 0 | 0 | 0 | 0 |
| 0 | 0 | 1 | 0 | 0 | 0 | 0 | 0 | 0 |
| 0 | 0 | 0 | 0 | 0 | 0 | 0 | 0 | 0 |
| 0 | 0 | 0 | 0 | ⊠ | 0 | 0 | 0 | 0 |
| 0 | 0 | 0 | 0 | 0 | 0 | 0 | 0 | 0 |
| 0 | 0 | 0 | 0 | 0 | 0 | 1 | 0 | 0 |
| 0 | 0 | 0 | 0 | 0 | 0 | 0 | 0 | 0 |
| 0 | 0 | 0 | 0 | 0 | 0 | 0 | 0 | 1 |

—P100

IMAGE PROCESSING APPARATUS, IMAGE PROCESSING METHOD, AND NON-TRANSITORY COMPUTER READABLE RECORDING MEDIUM

CROSS-REFERENCE TO RELATED APPLICATION

This application is a continuation of International Application No. PCT/JP2016/072445, filed on Jul. 29, 2016, the entire contents of which are incorporated herein by reference.

BACKGROUND

The present disclosure relates to an image processing apparatus, an image processing method, and a non-transitory computer readable recording medium.

Generally, when an image sensor used in an imaging apparatus, a circuit constituting a pixel may become defective due to manufacturing variation or degradation over time. A pixel value read out from such a pixel tends to be greater or smaller compared with pixels at neighboring portions (hereinafter referred to as "neighboring pixels"). As a technique for correcting the pixel value of a pixel having such a defect (hereinafter referred to as a "defective pixel"), there is a known technique that calculates pixel value variance when the pixel values of the neighboring pixels of a pixel of interest are defined as a group, and that calculates excessiveness indicating a degree of excessiveness of the pixel value of the pixel of interest with respect to the neighboring pixels obtained by normalizing a difference value between the pixel value of the pixel of interest and the pixel values of the neighboring pixels on the basis of the calculated variance (Refer to JP 4453332 B2). In this technique, the degree of excessiveness of the pixel value of the pixel of interest is compared with the degree of excessiveness of the pixel value of a different color filter at the same position as the pixel of interest to determine whether the pixel is a defective pixel, and when the pixel of interest is a defective pixel, the pixel value of the pixel of interest is corrected by using the pixel values of the neighboring pixels.

Furthermore, the image sensor reads out a pixel value corresponding to the electrical charge generated in accordance with the exposure amount. The maximum charge accumulation amount (saturation charge amount) in each of pixels of the image sensor varies from pixel to pixel due to manufacturing errors of the image sensor, or the like. For example, in the imaging of a flat subject with no contrast and high luminance, it is preferable that the read pixel values are uniformly saturated, and all pixels exhibit equivalent pixel values. However, the pixel having a low saturation charge amount due to variation in individual pixels is saturated at a pixel value lower than that of other pixels, leading to the pixel values not exhibiting the same pixel value. In a known technique (refer to WO 2013/154105 A), the pixel value of a pixel saturated with a lower pixel value (hereinafter referred to as "low saturation pixel") compared with the pixel values of the other pixels in this manner is replaced by an average value of pixel values of neighboring pixels so as to correct the pixel value of the pixel of interest.

SUMMARY

The present disclosure is directed to an improvement of an image processing apparatus and an image processing method.

According to a first aspect of the present disclosure, there is provided an image processing apparatus that processes noise resulting from a defective pixel, included in image data generated by an image sensor including a plurality of pixels two-dimensionally arranged to receive light from outside and generate a signal according to an amount of received light and including a plurality of read-out circuits that read out the signal as a pixel value. The image processing apparatus includes an acquisition unit that obtains the image data generated by the image sensor and position information of the defective pixel; a defective pixel correction unit that corrects the signal from the defective pixel included in the image data on the basis of the position information; a low saturation pixel correction unit that performs a low saturation pixel correction process on the image data in which the signal from the defective pixel has been corrected by the defective pixel correction unit, on the basis of a preliminarily calculated saturation level of each of the plurality of pixels, the low saturation pixel correction process correcting a low saturation signal from a low saturation pixel having a saturation level lower than the other pixels; and a saturation level calculation unit that calculates the saturation level of the defective pixel corrected by the defective pixel correction unit.

According to a second aspect of the present disclosure, there is provided an image processing method executed by an image processing apparatus that processes noise resulting from a defective pixel, included in image data generated by an image sensor including a plurality of pixels two-dimensionally arranged to receive light from outside and generate a signal according to the amount of received light and including a plurality of read-out circuits that reads out the signal as a pixel value. The image processing method includes obtaining the image data generated by the image sensor and position information of the defective pixel; correcting the signal from the defective pixel included in the image data on the basis of the position information; performing a low saturation pixel correction process on the image data in which the signal from the defective pixel has been corrected by the correcting, on the basis of a preliminarily calculated saturation level of each of the plurality of pixels, the low saturation pixel correction process correcting a low saturation signal from a low saturation pixel having a saturation level lower than the other pixels; and calculating the saturation level of the defective pixel corrected by the correcting.

According to a third aspect of the present disclosure, there is provided a non-transitory computer readable recording medium storing a program that causes an image processing apparatus that processes noise resulting from a defective pixel, included in image data generated by an image sensor including a plurality of pixels two-dimensionally arranged to receive light from outside and generate a signal according to the amount of received light and including a plurality of read-out circuits that reads out the signal as a pixel value, to execute processing. The processing includes obtaining the image data generated by the image sensor and position information of the defective pixel; correcting the signal from the defective pixel included in the image data on the basis of the position information; performing a low saturation pixel correction process on the image data in which the signal from the defective pixel has been corrected by the correcting, on the basis of a preliminarily calculated saturation level of each of the plurality of pixels, the low saturation pixel correction process correcting a low saturation signal from a low saturation pixel having a saturation level lower than the other pixels; and calculating the saturation level of the defective pixel corrected by the correcting.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 8 is a flowchart illustrating an outline of direction discrimination process in FIG. 7;

FIG. 9A is a diagram schematically illustrating an example of direction discrimination according to the first embodiment of the present disclosure;

FIG. 9B is a diagram schematically illustrating an example of direction discrimination according to the first embodiment of the present disclosure;

FIG. 9C is a diagram schematically illustrating an example of direction discrimination according to the first embodiment of the present disclosure;

FIG. 9D is a diagram schematically illustrating an example of direction discrimination according to the first embodiment of the present disclosure;

FIG. 9E is a diagram schematically illustrating an example of direction discrimination according to the first embodiment of the present disclosure;

FIG. 14A is a diagram illustrating an example of a reference mask referred to by a defective pixel correction unit according to the second embodiment of the present disclosure;

FIG. 14B is a diagram illustrating an example of a reference mask referred to by the defective pixel correction unit according to the second embodiment of the present disclosure;

FIG. 14C is a diagram illustrating an example of a reference mask referred to by the defective pixel correction unit according to the second embodiment of the present disclosure;

FIG. 14D is a diagram illustrating an example of a reference mask referred to by the defective pixel correction unit according to the second embodiment of the present disclosure;

FIG. 14E is a diagram illustrating an example of a reference mask referred to by the defective pixel correction unit according to the second embodiment of the present disclosure;

DETAILED DESCRIPTION OF THE PREFERRED EMBODIMENTS

Figure 1:
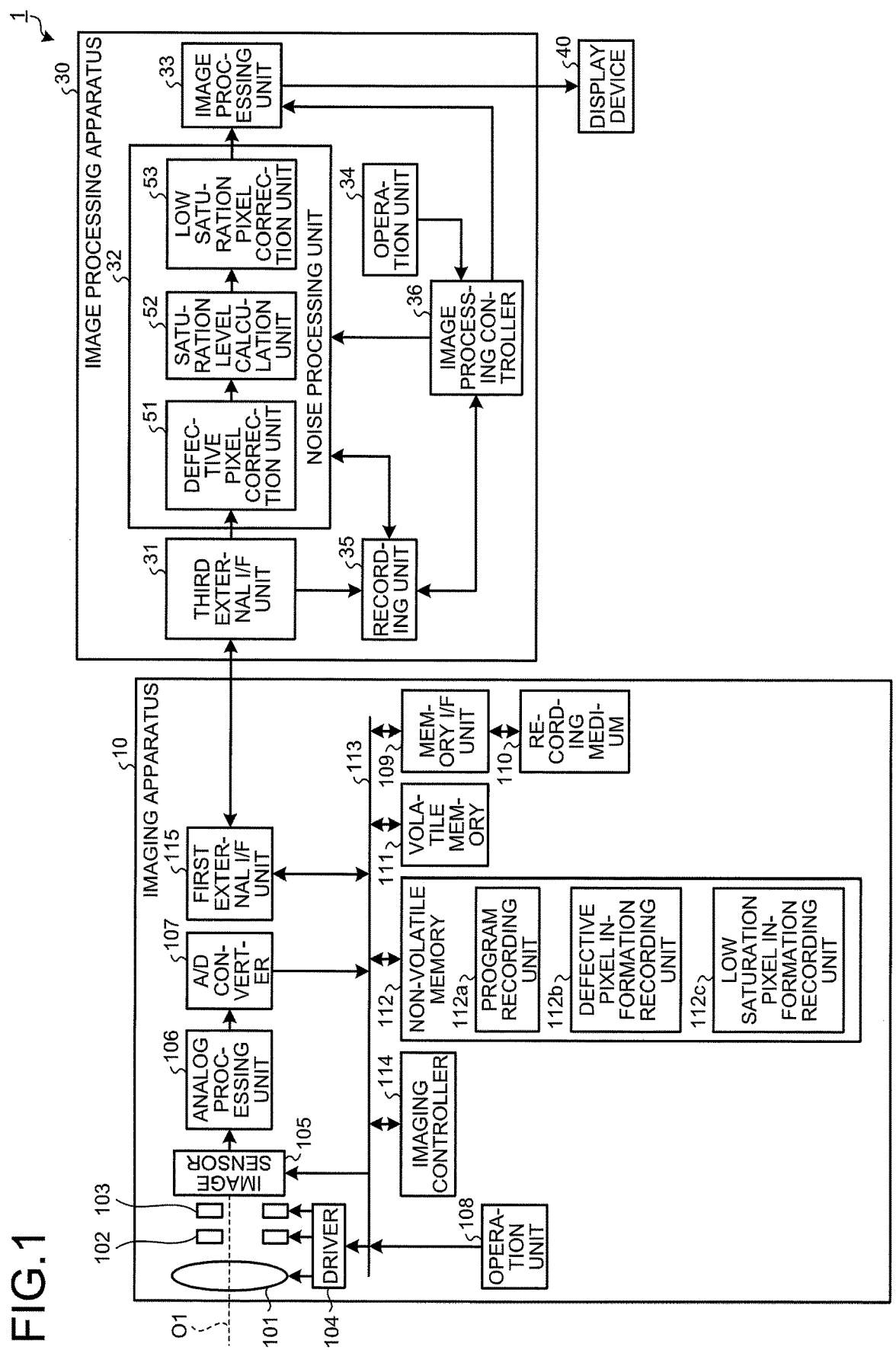
FIG. 1 is a block diagram schematically illustrating a configuration of an imaging system according to a first embodiment of the present disclosure.

Hereinafter, embodiments of the present disclosure (hereinafter, referred to as embodiment(s)) will be described with reference to the drawings. Note that the present disclosure is not limited by the following embodiments. In the description of the drawings, the same portions are given the same reference numerals.

First Embodiment

Configuration of Imaging System

FIG. 1 is a block diagram schematically illustrating a configuration of an imaging system according to a first embodiment of the present disclosure. An imaging system 1 illustrated in FIG. 1 includes an imaging apparatus 10, an image processing apparatus 30, and a display device 40.

Configuration of Imaging Apparatus

First, a configuration of the imaging apparatus 10 will be described. As illustrated in FIG. 1, the imaging apparatus 10 includes an optical system 101, a diaphragm 102, a shutter 103, a driver 104, an image sensor 105, an analog processing unit 106, an analog-to-digital (A/D) converter 107, an operation unit 108, a memory interface (I/F) unit 109, a recording medium 110, a volatile memory 111, a non-volatile memory 112, a bus 113, an imaging controller 114, and a first external I/F unit 115.

The optical system 101 includes one or more lenses. The optical system 101 includes a focus lens and a zoom lens, for example.

The diaphragm 102 adjusts exposure by limiting an amount of incident light collected by the optical system 101. Under the control of the imaging controller 114 described below, the diaphragm 102 limits the amount of the incident light collected by the optical system 101. Note that the amount of the incident light may be limited by using the shutter 103 and an electronic shutter in the image sensor 105 without using the diaphragm 102, in other embodiments. The optical system 101 and the diaphragm 102 may be configured to be detachable from the imaging apparatus 10.

The shutter 103 sets the state of the image sensor 105 to an exposure state or a light-shielding state. The shutter 103 includes a focal plane shutter, for example. Incidentally, an electronic shutter may be used in the image sensor 105 instead of the shutter 103.

Under the control of the imaging controller 114 described below, the driver 104 drives the optical system 101, the diaphragm 102, and the shutter 103. For example, the driver 104 moves the optical system 101 along an optical axis O1 to perform zoom magnification change or focusing position adjustment for the imaging apparatus 10.

Under the control of the imaging controller 114 described below, the image sensor 105 receives the light collected by the optical system 101, converts the received light into image data (electrical signal), and outputs the image data. The image sensor 105 includes a complementary metal oxide semiconductor (CMOS) including a plurality of two-dimensionally arranged pixels. An RGB filter arranged in a Bayer array is disposed on a front surface of each of the pixels. Note that the image sensor 105 is not limited to the Bayer array but may be in a stacked form such as Fovion's, for example. Moreover, not only RGB filter but also any other filters such as a complementary color filter may be employed. Alternatively, a light source may be used which is capable of emitting light beams of different colors on a time division basis without disposing a filter on the image sensor 105, and to form a color image using sequentially captured images while changing the colors of the beams to be emitted. Moreover, the image sensor 105 has an electronic shutter function capable of electronically controlling the amount of received light.

Figure 2:
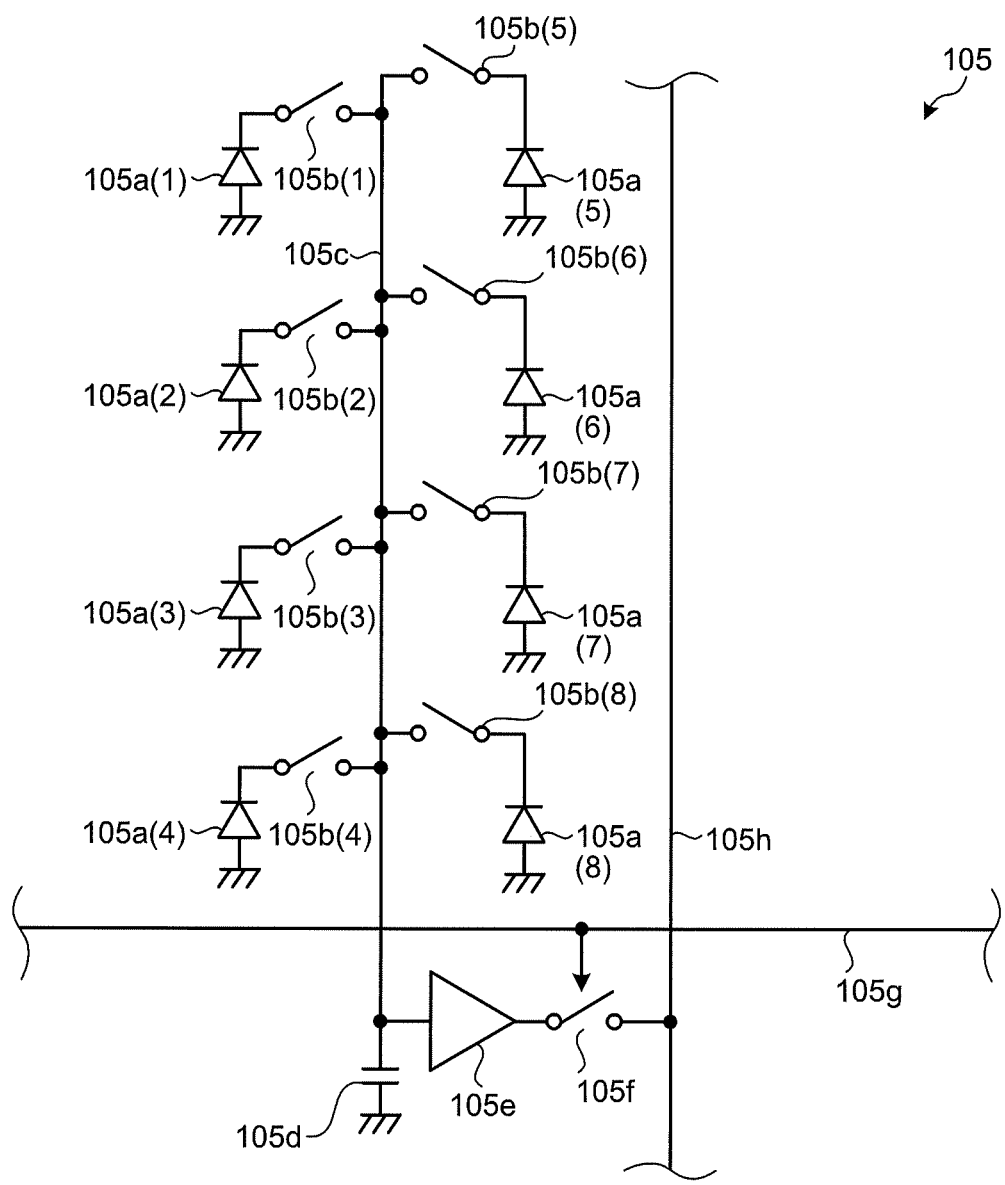
FIG. 2 is a diagram schematically illustrating a configuration of main portions of an image sensor according to the first embodiment of the present disclosure.

Now, a configuration of the image sensor 105 will be described in detail. FIG. 2 is a diagram schematically illustrating a configuration of main portions of the image sensor 105. Note that the image sensor 105 in FIG. 2 is an exemplary case where a read-out circuit is shared by a plurality of pixels in order to enhance sensitivity by increasing the aperture ratio of the pixel. Note that the image sensor 105 illustrated in FIG. 2 includes one read-out circuit arranged for eight pixels, that is, two pixels in the horizontal direction (lateral direction)×four pixels in the vertical direction (longitudinal direction). Note that, while FIG. 2 illustrates an exemplary case where one read-out circuit is arranged for eight pixels, that is, two pixels in the horizontal direction (lateral direction) x four pixels in the vertical direction (longitudinal direction), the image sensor 105 according to the first embodiment is assumed to have a configuration in which the above-described pixels and the read-out circuit are arranged side by side in horizontal and vertical directions.

As illustrated in FIG. 2, the image sensor 105 includes a plurality of pixels (photodiodes) 105a, a first switch 105b, a transfer line 105c, a floating diffusion (FD) unit 105d, an amplifier unit 105e, a second switch 105f, a control line 105g, and a transfer line 105h. Each of the plurality of pixels 105a receives light by exposure, and performs photoelectric conversion, thereby generating electrical charges in accordance with an exposure amount. The first switch 105b is provided on each of the plurality of pixels 105a, and opens or closes in accordance with the control of the imaging controller 114. The transfer line 105c transfers signals (electrical charges) output from each of the plurality of pixels 105a. The floating diffusion (FD) unit 105d stores the signals output from the plurality of pixels 105a. The amplifier unit 105e amplifies the signals output from the FD unit 105d. The second switch 105f opens or closes according to the control of the imaging controller 114. The control line 105g controls the second switch 105f. The transfer line 105h transfers the electrical signal amplified by the amplifier unit 105e.

When the above-configured image sensor 105 reads out a signal that corresponds to the exposure amount on pixels 105a(1) to 105a(8) as a pixel value, the electrical charge generated on the pixel 105a(1) is transferred to the FD unit 105d by first resetting the FD unit 105d and by turning on solely a first switch 105b(1) by the imaging controller 114. Thereafter, the imaging controller 114 turns on the second switch 105f, whereby the image sensor 105 causes the amplifier unit 105e to amplify the electrical charges stored in the FD unit 105d and reads out (outputs) the electrical charge as a pixel value. Next, the image sensor 105 resets the FD unit 105d and the imaging controller 114 turns on solely a first switch 105b(2), whereby the image sensor 105 transfers the electrical charges generated at the pixel 105a(2) to the FD unit 105d. Thereafter, the imaging controller 114 turns on the second switch 105f, whereby the image sensor 105 causes the amplifier unit 105e to amplify the electrical charges stored in the FD unit 105d and reads out the electrical charges as a pixel value. By sequentially performing such read-out operation, the image sensor 105 can sequentially output the signal that corresponds to the exposure amount on each of the pixels 105a(1) to 105a(8), as a pixel value. Note that in the first embodiment, the FD unit 105d, the amplifier unit 105e, and the second switch 105f serve as a read-out circuit that reads out electrical charges from each of the plurality of pixels 105a.

Returning to FIG. 1, description of the configuration of the imaging apparatus 10 follows below.

The analog processing unit 106 performs predetermined analog process onto an analog signal input from the image sensor 105 and outputs the processed signal to the A/D converter 107. Specifically, the analog processing unit 106 performs noise reduction process, gain-up process, or the like, on the analog signal input from the image sensor 105. For example, the analog processing unit 106 performs, onto the analog signal, reduction of reset noise and so on, and waveform shaping, and then, further performs gain-up so as to achieve intended brightness.

The A/D converter 107 generates digital image data (hereinafter, referred to as "RAW image data") by performing A/D conversion onto the analog signal input from the analog processing unit 106, and outputs the generated data to the volatile memory 111 via the bus 113. Note that the A/D converter 107 may directly output the RAW image data to predetermined parts of the imaging apparatus 10 described below. Note that the analog processing unit 106 and the A/D converter 107 may be provided in the image sensor 105, and the image sensor 105 directly may output digital RAW image data.

The operation unit 108 issues various instructions to each part of the imaging apparatus 10. Specifically, the operation unit 108 includes a power switch that switches the power supply states of the imaging apparatus 10 between an on-state and an off-state, a release switch that issues an instruction of still image shooting, an operation switch that switches various settings of the imaging apparatus 10, and a moving image switch that issues an instruction of moving image shooting.

The recording medium 110 includes a memory card attached from outside of the imaging apparatus 10, and is removably attached onto the imaging apparatus 10 via the memory I/F unit 109. Moreover, the recording medium 110 may output programs and various types of information to the non-volatile memory 112 via the memory I/F unit 109 under the control of the imaging controller 114.

The volatile memory 111 temporarily records image data input from the A/D converter 107 via the bus 113. For example, the volatile memory 111 temporarily stores image data sequentially output from the image sensor 105 frame by frame, via the analog processing unit 106, the A/D converter 107, and the bus 113. The volatile memory 111 includes a synchronous dynamic random access memory (SDRAM).

The non-volatile memory 112 being constituted with a flash memory, or the like, records various programs needed to operate the imaging apparatus 10 and various types of data used in execution of the program. The non-volatile memory 112 further includes: a program recording unit 112a; a defective pixel information recording unit 112b that records position information (position information includes one or both of position information of the read-out circuit that reads out the pixel value (position information of the amplifier unit 105e) and position information of a pixel in which a defective pixel occurs) of a defective pixel corresponding to the position of a pixel in the image sensor 105; and a low saturation pixel information recording unit 112c that records position information (position information includes one or both of position information of the read-out circuit that reads out the pixel value (position information of the amplifier unit 105e) and position information of a pixel in which a low saturation pixel occurs) of a low saturation pixel corresponding to the position of a pixel in the image sensor 105. Here, the defective pixel may include defective pixels known as a white spot, a black spot, and a blinking defect that causes blinking defect noise.

The bus 113 includes a transmission line that connects individual parts of the imaging apparatus 10 with each other, and transfers various types of data generated inside the imaging apparatus 10 to each of the individual parts of the imaging apparatus 10.

The imaging controller 114 may be configured of a central processing unit (CPU) or the like, and integrally controls operations of the imaging apparatus 10 by providing instruction and transferring data to individual part of the imaging apparatus 10 in response to an instruction signal and a release signal from the operation unit 108. For example, when a second release signal has been input from the operation unit 108, the imaging controller 114 starts control of shooting operation on the imaging apparatus 10. Here, the shooting operation in the imaging apparatus 10 is operation in which the analog processing unit 106 and the A/D converter 107 perform predetermined process on the exposure timing of the image sensor 105, the output timing of the analog signal, and the analog signal output from the image sensor 105. The image data processed in this manner are recorded in the recording medium 110 via the bus 113 and the memory I/F unit 109 under the control of the imaging controller 114.

The first external I/F unit 115 outputs information input from external apparatuses via the bus 113, to the non-volatile memory 112 or the volatile memory 111, and together with this, outputs, to external apparatuses via the bus 113, information recorded in the volatile memory 111, information recorded in the non-volatile memory 112, and the image data generated by the image sensor 105. Specifically, the first external I/F unit 115 outputs image data, defective pixel information, and low saturation pixel information generated by the image sensor 105 to the image processing apparatus 30 via the bus 113.

Configuration of Image Processing Apparatus

Next, a configuration of the image processing apparatus 30 will be described. The image processing apparatus 30 includes a third external I/F unit 31, a noise processing unit 32, an image processing unit 33, an operation unit 34, a recording unit 35, and an image processing controller 36.

The third external I/F unit 31 operates as an acquisition unit that obtains image data generated by the image sensor 105 via the first external I/F unit 115 of the imaging apparatus 10, and obtains defective pixel information recorded in the defective pixel information recording unit 112b and low saturation pixel information recorded in the low saturation pixel information recording unit 112c within the non-volatile memory 112, and outputs the obtained image data, defective pixel information and low saturation pixel information to the noise processing unit 32 and the recording unit 35. The third external I/F unit 31 and the first external I/F unit 115 are mutually connected via a control cable, wireless communication, or the like, capable of bidirectionally exchanging information, for example. The third external I/F unit 31 functions as an acquisition unit in the present embodiment.

The noise processing unit 32 processes the noise resulted from the defective pixel in the RAW image data input from the third external I/F unit 31 on the basis of the saturation level, corrects the low saturation pixel and outputs the corrected pixel value to the image processing unit 33. The noise processing unit 32 includes a defective pixel correction unit 51, a saturation level calculation unit 52, and a low saturation pixel correction unit 53.

The defective pixel correction unit 51 corrects a defective pixel in the RAW image data on the basis of the saturation level. Specifically, the defective pixel correction unit 51 corrects the defective pixel on the basis of defective pixel information. Note that the defective pixel correction unit 51 may use the position of the defective pixel alone to perform correction by using the neighboring pixels of the defective pixel.

The saturation level calculation unit 52 calculates the saturation level of the defective pixel in accordance with the correction method of the defective pixel correction unit 51 and outputs information including the calculated saturation level and the position of the defective pixel as low saturation pixel information.

The low saturation pixel correction unit 53 corrects the low saturation pixel in the RAW image data. Specifically, the low saturation pixel correction unit 53 performs correction on the basis of the low saturation pixel information (including information on the position of low saturation pixel and the saturation level in the low saturation pixel other than the defective pixel, and information on the position of the defective pixel and the saturation level in the defective pixel) such that correction is made so as to achieve a pixel value similar to the neighboring pixel(s) of the low saturation pixel when the low saturation pixel is saturated. On the other hand, the pixel value of the pixel is output as it is when the pixel is not saturated.

The image processing unit 33 applies predetermined image processes on the image data in which noise has been corrected by the noise processing unit 32, and outputs the processed data to the display device 40. The predetermined image processes may include basic image process including at least optical black subtraction process, white balance adjustment process, and including synchronization process of the image data, color matrix calculation process, γ correction process, color reproduction process, and edge enhancement process when the image sensor 105 is arranged in a Bayer array. Moreover, the image processing unit 33 performs image process of reproducing a natural image on the basis of individual image processing parameters that have been set beforehand. The parameters of image process are values of contrast, sharpness, saturation, white balance, and gradation.

The operation unit 34 receives inputs of various operation signals related to the image processing apparatus 30. The operation unit 34 is configured by using, for example, a cross button, a push button, a touch panel, and the like.

The recording unit 35 is configured by using a volatile memory or a non-volatile memory, and records defective pixel information and low saturation pixel information output from the third external I/F unit 31.

The image processing controller 36 integrally controls individual components of the image processing apparatus 30. The image processing controller 36 is formed of a CPU or the like. The image processing controller 36 controls instructions for individual parts of the image processing apparatus 30, data transfer, or the like.

Configuration of Display Device

Next, a configuration of the display device 40 will be described. The display device 40 displays an image that corresponds to the image data input from the image processing apparatus 30. The display device 40 includes a display panel of liquid crystal, organic electroluminescence (EL), or the like.

In the imaging system 1 having the above configuration, the image processing apparatus 30 corrects a defective pixel and/or a low saturation pixel in the image sensor 105, and the display device 40 displays an image that corresponds to the image data that has undergone image process performed by the image processing apparatus 30.

Low Saturation Pixel Information

Figures 3, 4:
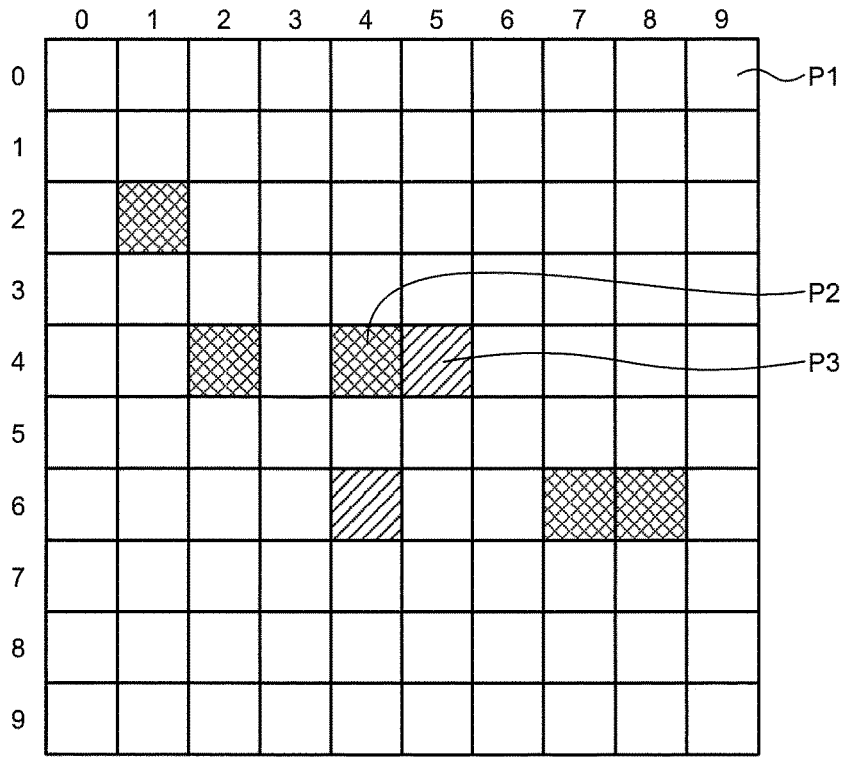
FIG. 3 is a diagram schematically illustrating an example of a defective pixel and a low saturation pixel in the image sensor according to the first embodiment of the present disclosure.
FIG. 4 is a diagram schematically illustrating an example of low saturation pixel information recorded in a low saturation pixel information recording unit according to the first embodiment of the present disclosure.
Figures 5, 6:
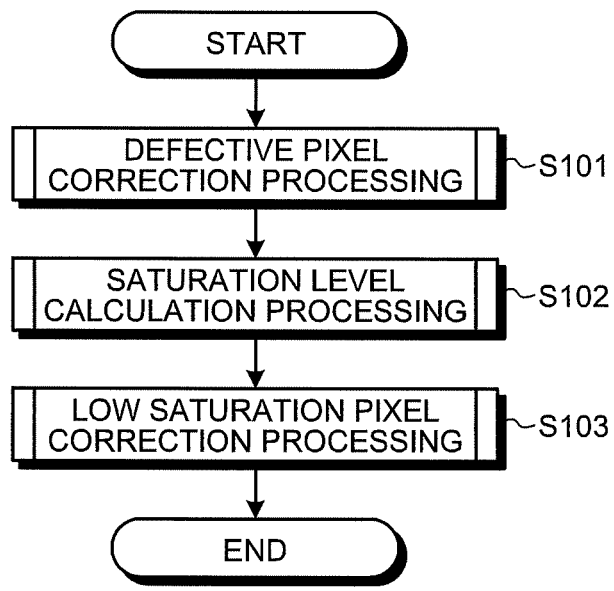
FIG. 5 is a diagram schematically illustrating another example of the low saturation pixel information recorded in the low saturation pixel information recording unit according to the first embodiment of the present disclosure.
FIG. 6 is a flowchart illustrating an outline of noise process executed by an image processing apparatus according to the first embodiment of the present disclosure.

Next, the low saturation pixel information recorded in the low saturation pixel information recording unit 112c will be described. FIG. 3 is a diagram schematically illustrating an example of a defective pixel and a low saturation pixel in the image sensor. FIG. 4 is a diagram schematically illustrating an example of low saturation pixel information recorded in the low saturation pixel information recording unit 112c. FIG. 5 is a diagram schematically illustrating another example of the low saturation pixel information recorded in the low saturation pixel information recording unit 112c. In FIG. 3, a pixel P1 indicates a normal pixel (no hatch), a pixel P2 (with hatch) indicates a defective pixel including a white spot defect, a black spot defect, or a blinking defective, and a pixel P3 (with hatch) indicates a low saturation pixel. Moreover, in FIG. 4, pixels P10 and P11 indicate low saturation pixels.

As illustrated in FIGS. 3 to 5, the low saturation pixel information includes position information for each of pixels and a saturation level detected beforehand by a detection device or the like in association with each other. As a recording method, there are a method (refer to FIG. 4) of obtaining a saturation level map in which a saturation level is set for each of a plurality of pixels in RAW image data generated by the image sensor 105, and a method (refer to FIG. 5) of obtaining coordinates (address) and the saturation level of the low saturation pixel, in association with each other. When implementing the method of obtaining the coordinates (address) of the low saturation pixel in association with the saturation level, a coordinate and a corresponding saturation level are recorded in association with each other for the low saturation pixel and only the saturation level is recorded for a pixel other than the low saturation pixel. When the coordinates in association with the saturation level are recorded, the corresponding saturation level is going to be used. When the coordinates are not recorded, the saturation level of pixels other than the low saturation pixel is going to be used. However, regarding a pixel that is not a low saturation pixel, when it is sufficiently saturated, a maximum value of the pixel value (for example, 4095 in the case of 12 bits) may be set as the saturation level.

Incidentally, in FIGS. 4 and 5, the saturation level is recorded so as to correspond to the position of the pixel. However, when the saturation level is lowered due to the read-out circuit, the saturation level may be recorded to correspond to the position of the read-out circuit (of course, the saturation level may be recorded by the method illustrated in FIGS. 4 and 5). In this case, the information converted to the saturation level on a pixel-by-pixel basis may be set as the low saturation pixel information, such as setting the same saturation level to the pixels sharing the read-out circuit after reading out the recorded information.

Furthermore, the saturation level of each of pixels may desirably be determined in consideration of the linearity of the pixel value and random noise, or the like. For example, a value obtained by reducing a value based on the random noise amount of the luminance from the pixel value of an image obtained by exposure under a condition achieving complete saturation may be set as the saturation level of the pixel. Alternatively, the pixel value at which the linearity is lost may be set as the saturation level. The saturation level may of course be set in consideration of both.

Process in Image Processing Apparatus

Next, process to be executed by the image processing apparatus 30 will be described. FIG. 6 is a flowchart illustrating an outline of noise process executed by the image processing apparatus 30, that is, a flowchart of a main routine executed by the image processing apparatus 30.

As illustrated in FIG. 6, first, the defective pixel correction unit 51 executes defective pixel correction process of correcting a defective pixel in the RAW image input from the third external I/F unit 31 (Step S101). Details of the defective pixel correction process will be described later.

Subsequently, the saturation level calculation unit 52 executes saturation level calculation process of calculating the level of the low saturation pixel in the RAW image (Step S102). Details of the saturation level calculation process will be described later.

Thereafter, the low saturation pixel correction unit 53 executes low saturation pixel correction process of correcting the low saturation pixel in the RAW image (Step S103). Details of the low saturation pixel correction process will be described later. After Step S103, the image processing apparatus 30 finishes the current process.

Defective Pixel Correction Process

Figure 7:
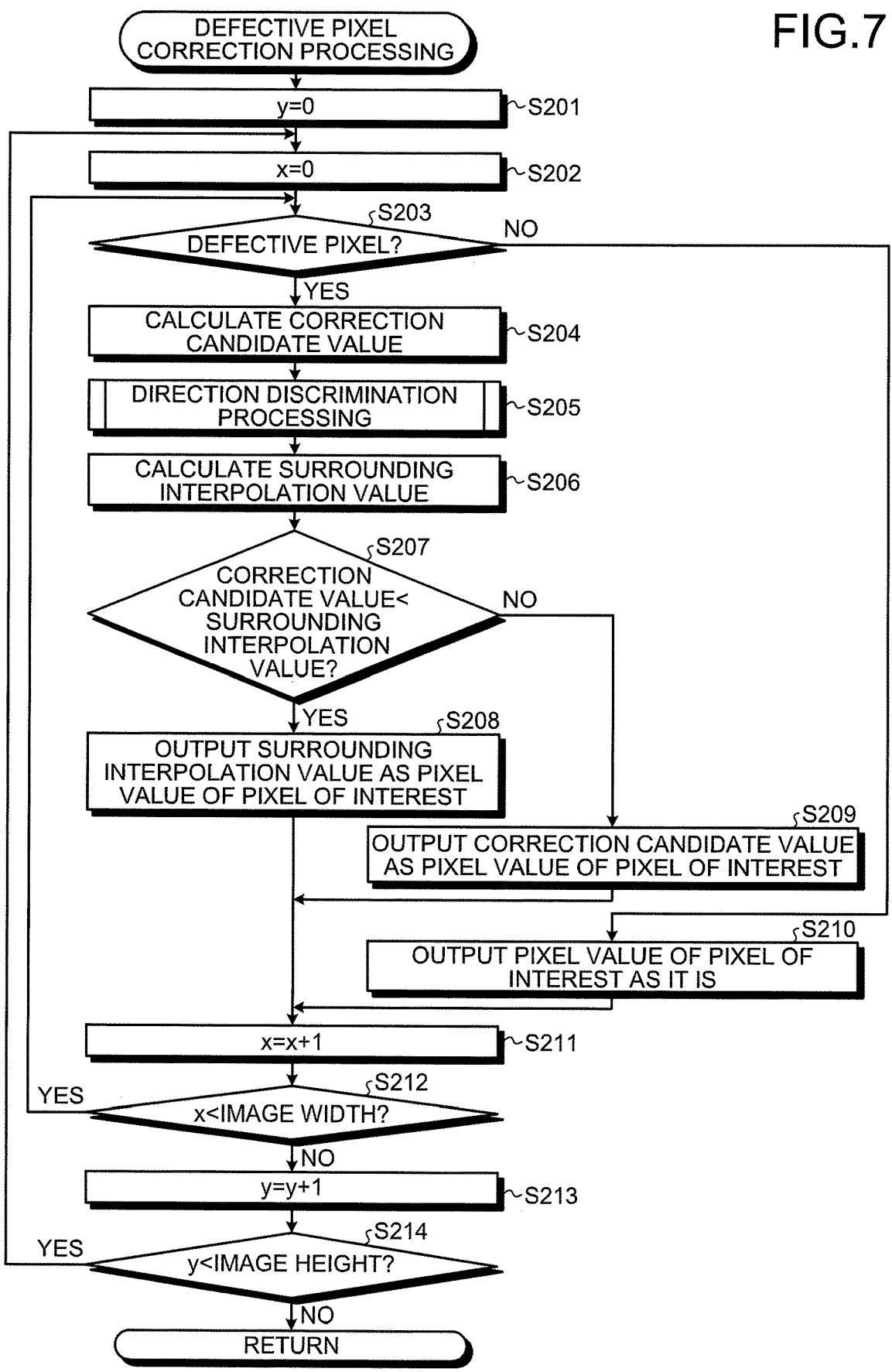
FIG. 7 is a flowchart illustrating an outline of defective pixel correction process in FIG. 6.

Next, details of the defective pixel correction process described in Step S101 in FIG. 6 will be described. FIG. 7 is a flowchart illustrating an outline of defective pixel correction process, that is, a flowchart of a subroutine executed by the image processing apparatus 30.

As illustrated in FIG. 7, first, the defective pixel correction unit 51 resets a counter y (to y=0) indicating the position of the RAW image in the vertical direction (Step S201), and resets a counter x (to x=0) indicating the position of the RAW image in the horizontal direction (Step S202). Incidentally, an upper end of the RAW image is set to 0 in the counter y indicating the position of the RAW image in the vertical direction, and a left end of the RAW image is set to 0 in the counter x indicating the position of the RAW image in the horizontal direction.

Subsequently, the defective pixel correction unit 51 determines whether the pixel of interest is a defective pixel (Step S203). When the pixel of interest is a defective pixel (Step S203: Yes), the process proceeds to Step S204 described below. In contrast, when the pixel of interest is not a defective pixel (Step S203: No), the process proceeds to Step S210 described below.

In Step S204, the defective pixel correction unit 51 subtracts the defective pixel level from the pixel value of the pixel of interest to calculate a correction candidate value.

Subsequently, the defective pixel correction unit 51 executes a direction discrimination process of discriminating a direction having a high correlation with the pixel of interest (Step S205). After Step S205, the defective pixel correction unit 51 advances the process to Step S206 described below.

Outline of Direction Discrimination Process

FIG. 8 is a flowchart illustrating an outline of the direction discrimination process in Step S205 in FIG. 7. As illustrated in FIG. 8, the defective pixel correction unit 51 first resets the index i (i=0) indicating the direction (Step S301) and then calculates the correlation value in the i direction (Step S302).

Figures 9A, 9B, 9C:
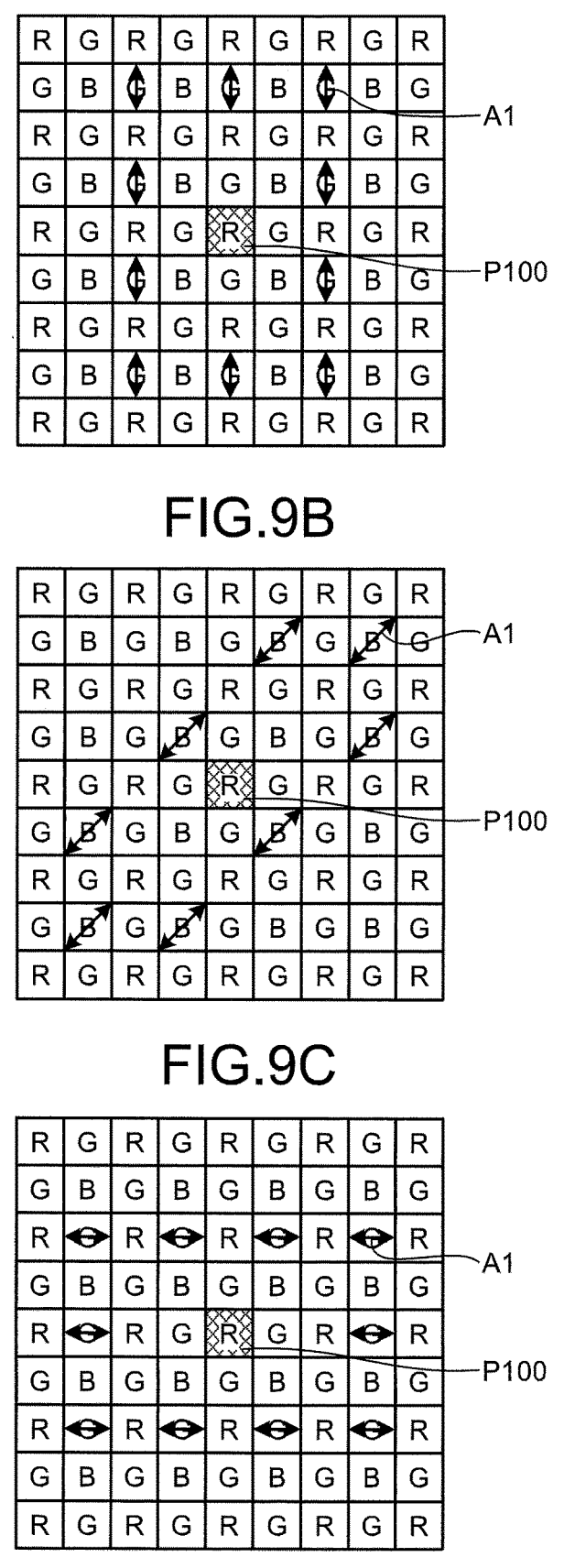
Figures 9D, 9E:
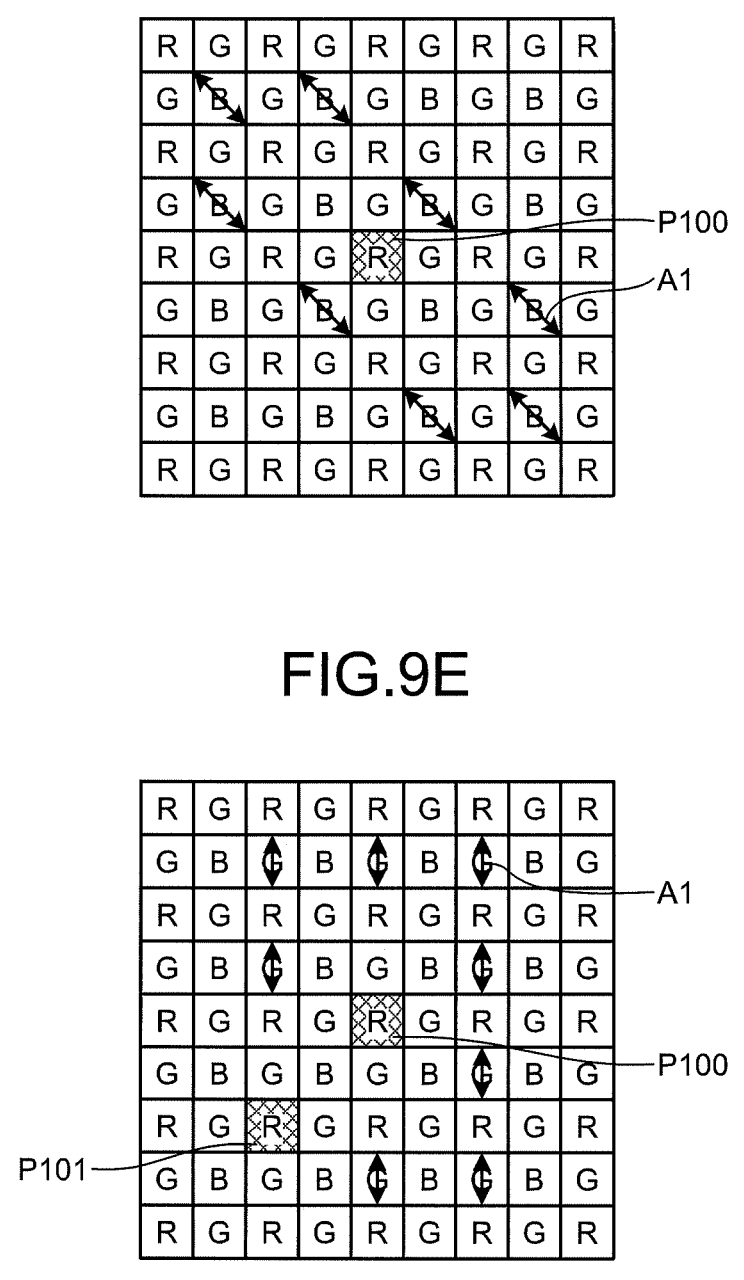

FIG. 9A is a diagram schematically illustrating an example of direction discrimination according to the first embodiment of the present disclosure, in which the direction discrimination direction is a direction 0. FIG. 9B is a diagram schematically illustrating an example of direction discrimination according to the first embodiment of the present disclosure, in which the direction discrimination direction is a direction 1. FIG. 9C is a diagram schematically illustrating an example of direction discrimination according to the first embodiment of the present disclosure, in which the direction discrimination direction is a direction 2. FIG. 9D is a diagram schematically illustrating an example of direction discrimination according to the first embodiment of the present disclosure, in which the direction discrimination direction is a direction 3.

As illustrated in FIGS. 9A to 9D, the defective pixel correction unit 51 calculates, in a range of 9×9, an absolute difference between adjacent pixels (arrows A1 in FIGS. 9A to 9D) of the same color as a pixel of interest P100 (R pixel) so as to calculate an average of the calculated absolute differences, as a correlation value. In this case, the smaller the correlation value is, the higher the correlation value becomes in that direction. Furthermore, as illustrated in FIG. 9E, the defective pixel correction unit 51 would not calculate the difference between the adjacent pixels when one of the adjacent pixels is a defective pixel (refer to a pixel P101 in FIG. 9E). Furthermore, in consideration of the saturation level, the defective pixel correction unit 51 may calculate the absolute difference when the adjacent pixels are pixels below the saturation level and when neither is the defective pixel. In FIGS. 9A to 9D, although the defective pixel correction unit 51 uses the absolute difference between some adjacent pixels in the 9×9 pixels, the absolute differences between all the adjacent pixels may be used. For example, while the defective pixel correction unit 51 uses R pixels in three lines in the case of the horizontal direction in the direction 2 of FIG. 9C, the R pixels in five lines may be used in the case of FIG. 9C. Moreover, when the number of calculation of the absolute difference is zero (all are defective pixels etc.), the correlation value in that direction would be the maximum value (value with the lowest correlation) that can be taken as the average value of absolute differences.

Thereafter, the defective pixel correction unit 51 increments an index i (i=i+1) indicating the direction (Step S303), determines whether the index i indicating the direction is less than the number of directions (Step S304). When the index i indicating the direction is less than the number of directions (index i is less than four in the exemplary case illustrated in FIGS. 9A to 9D) (Step S304: Yes), the defective pixel correction unit 51 returns the process back to the above-described Step S302. When the index i indicating the direction is not less than the number of directions (Step S304: No), the defective pixel correction unit 51 proceeds to Step S305 described below.

In Step S305, the defective pixel correction unit 51 finalizes the direction having the highest correlation as a direction discrimination result for the pixel of interest. At this time, when the correlation is the same in all the directions, the defective pixel correction unit 51 finalizes a predetermined direction (for example, a direction in which i=0) as the direction discrimination result. After Step S305, the image processing apparatus 30 returns the process back to the subroutine in FIG. 7.

In this manner, by performing the direction discrimination process, the defective pixel correction unit 51 can determine the direction having high correlation with the pixel of interest even when there is a defective pixel around the pixel of interest. Note that in the case of performing the direction discrimination process, the defective pixel correction unit 51 may perform the direction discrimination process using pixels that are not saturated in consideration of low saturation pixels. With this, even when the low saturation pixel is located around the pixel of interest, direction discrimination may be accurately performed. Furthermore, the defective pixel correction unit 51 needs not necessarily perform the direction discrimination process as long as the correlation between the pixel of interest and the neighboring pixels can be determined by using a known technique, for example, block matching or the like.

Returning to FIG. 7, Step S206 and subsequent process will be described.

In Step S206, the defective pixel correction unit 51 calculates a neighboring interpolation value using pixel values of pixels that are not defective pixels in the direction of high correlation, on the basis of the direction discrimination result. Here, the neighboring interpolation value is defined, for example, as an average value of pixels which are not defective pixels and which are not saturated pixels in a direction of high correlation within a range of 5×5 around the pixel of interest. The neighboring interpolation value may be a weighted average value obtained by using a pixel other than the defective pixel and reducing the weight of the saturated pixel. Alternatively, when there is no unsaturated pixel and non-defective pixel in a direction of high correlation within a range of 5×5 around the pixel of interest, the defective pixel correction unit 51 may use a statistic value of the neighboring pixels, such as median within a range of 5×5 around the pixel of interest, as the neighboring interpolation value. Moreover, when the image sensor has a color filter, the defective pixel correction unit 51 calculates the neighboring interpolation value by using a pixel value of the pixel of interest and pixel values of neighboring pixels of the same color as the pixel of interest.

Subsequently, the defective pixel correction unit 51 determines whether the correction candidate value is smaller than the neighboring interpolation value (Step S207). When the correction candidate value is smaller than the neighboring interpolation value (Step S207: Yes), the defective pixel correction unit 51 outputs the neighboring interpolation value as a pixel value of the pixel of interest (Step S208). More specifically, when the correction candidate value is smaller than the neighboring interpolation value, the defective pixel correction unit 51 outputs the neighboring interpolation value as a correction result because there is a possibility of overcorrection. After Step S208, the defective pixel correction unit 51 advances the process to Step S211 described below. At this time, it is allowable to determine Yes when the difference between the correction candidate value and the neighboring interpolation value is a predetermined value or more, and to determine No when the difference is less than the predetermined value. This makes it possible to prevent overcorrection of a white spot defect and unfinished correction of a black spot defect. That is, overcorrection and unfinished correction can be prevented by comparing the differences.

In Step S207, when the correction candidate value is not smaller than the neighboring interpolation value (Step S207: No), the defective pixel correction unit 51 outputs the correction candidate value as the pixel value of the pixel of interest (Step S209). After Step S209, the defective pixel correction unit 51 advances the process to Step S211 described below.

In Step S203, when the pixel of interest is not a defective pixel (Step S203: No), the defective pixel correction unit 51 outputs the pixel value of the pixel of interest (S210) as it is because correction is unnecessary. After Step S210, the defective pixel correction unit 51 advances the process to Step S211 described below.

Subsequently, the defective pixel correction unit 51 increments the counter x (x=x+1) indicating the position of the RAW image in the horizontal direction (Step S211), and determines whether the counter x is smaller than an image width of the RAW image (Step S212). When the counter x is smaller than the image width of the RAW image (Step S212: Yes), the defective pixel correction unit 51 returns the process back to the above-described Step S203. When the counter x is not smaller than the image width of the RAW image (Step S212: No), the defective pixel correction unit 51 advances the process to Step S213.

Subsequently, the defective pixel correction unit 51 increments the counter y (y=y+1) indicating the position of the RAW image in the vertical direction (Step S213), and determines whether the counter y is smaller than an image height of the RAW image (Step S214). When the counter y is smaller than the image height of the RAW image (Step S214: Yes), the defective pixel correction unit 51 returns the process back to the above-described Step S202. When the counter y is not smaller than the image height of the RAW image (Step S214: No), the defective pixel correction unit 51 finishes the current process (the subroutine) and returns the process to the main routine of FIG. 6.

In this manner, the defective pixel correction unit 51 can correct defective pixels with high accuracy by performing the above-described process.

Saturation Level Calculation Process

Figure 10:
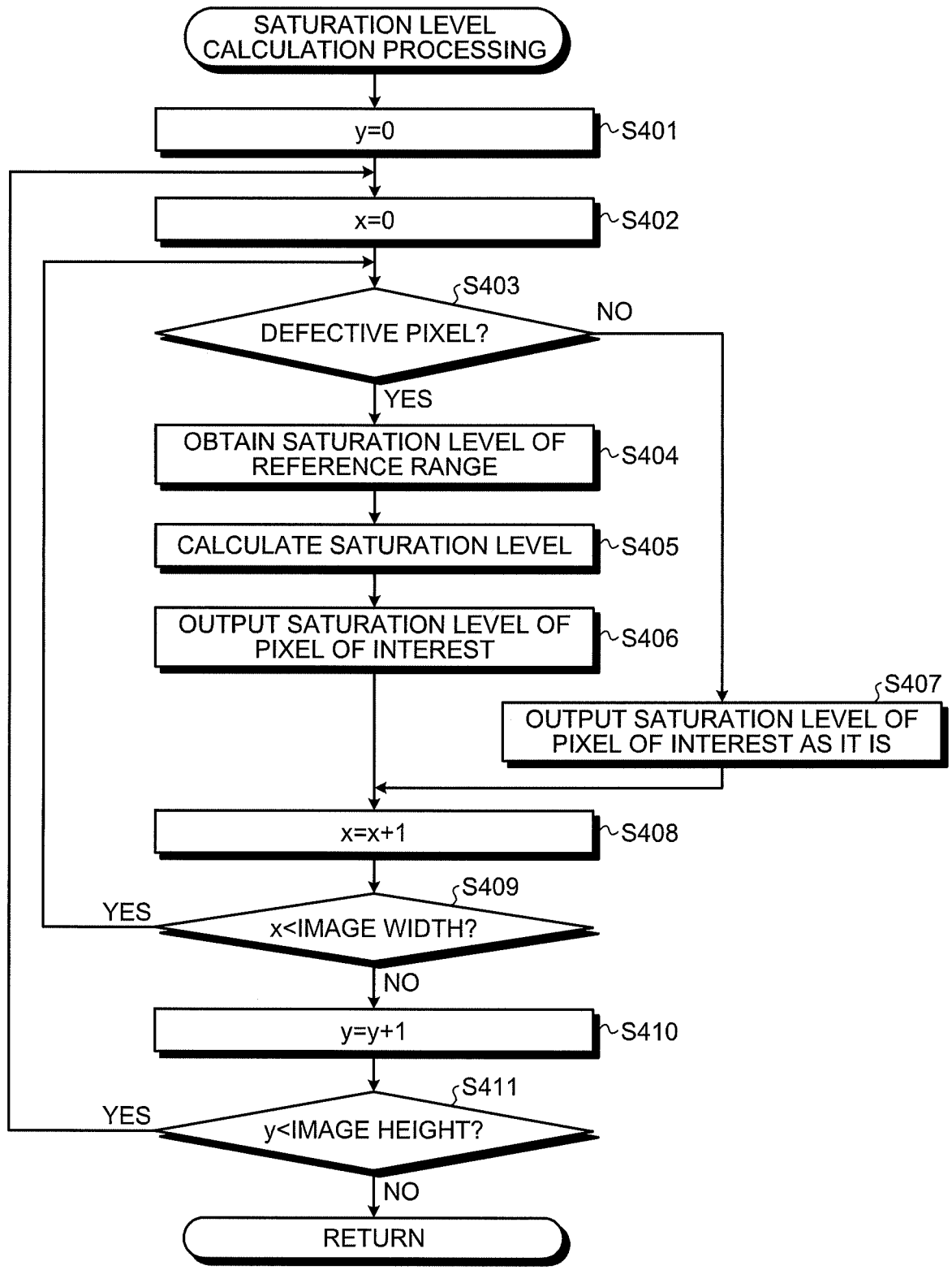
FIG. 10 is a flowchart illustrating an outline of saturation level calculation process in FIG. 6.

Next, details of the saturation level calculation process described in Step S102 of FIG. 6 will be described. FIG. 10 is a flowchart illustrating an outline of saturation level calculation process, that is, a flowchart of a subroutine executed by the image processing apparatus 30.

As illustrated in FIG. 10, first, the saturation level calculation unit 52 resets a counter y (to y=0) indicating the position of the RAW image in the vertical direction (Step S401) and resets a counter x (to x=0) indicating the position of the RAW image in the horizontal direction (Step S402). Incidentally, an upper end of the RAW image is set to 0 in the counter y indicating the position of the RAW image in the vertical direction, and a left end of the RAW image is set to 0 in the counter x indicating the position of the RAW image in the horizontal direction.

Subsequently, the saturation level calculation unit 52 determines whether the pixel of interest is a defective pixel (Step S403). When the pixel of interest is a defective pixel (Step S403: Yes), the process proceeds to Step S404 described below. When the pixel of interest is not a defective pixel (Step S403: No), the process proceeds to Step S407 described below.

In Step S404, the saturation level calculation unit 52 obtains saturation levels within a reference range in the defective pixel correction process of FIG. 7 described above. In this case, the saturation level calculation unit 52 obtains at least the saturation level for the pixel actually used in the defective pixel correction process in a region in the reference range.

Subsequently, the saturation level calculation unit 52 selects the minimum value from the saturation levels obtained in Step S404 as a saturation level of the pixel of interest (Step S405). Note that the saturation level calculation unit 52 may obtain the saturation level by a statistical method other than the minimum value. While this case might cause overcorrection, use of the minimum value is helpful to prevent the correction from being overlooked.

Thereafter, the saturation level calculation unit 52 outputs the saturation level calculated in Step S406 as the saturation level of the pixel of interest. After Step S406, the saturation level calculation unit 52 advances the process to Step S408 described below.

In Step S407, the saturation level calculation unit 52 outputs the saturation level of the pixel of interest as it is.

Subsequently, the saturation level calculation unit 52 increments the counter x indicating the position of the RAW image in the horizontal direction (x=x+1) (Step S408), and determines whether the counter x is smaller than the image width of the RAW image (Step S409). When the counter x is smaller than the image width of the RAW image (Step S409: Yes), the saturation level calculation unit 52 returns the process back to the above-described Step S403. When the counter x is not smaller than the image width of the RAW image (Step S409: No), the saturation level calculation unit 52 advances the process to Step S410.

Subsequently, the saturation level calculation unit 52 increments the counter y (y=y+1) indicating the position of the RAW image in the vertical direction (Step S410), and determines whether the counter y is smaller than the image height of the RAW image (Step S411). When the counter y is smaller than the image height of the RAW image (Step S411: Yes), the saturation level calculation unit 52 returns the process to the above-described Step S402. When the counter y is not smaller than the image height of the RAW image (Step S411: No), the saturation level calculation unit 52 finishes the current process (the subroutine) and returns the process to the main routine in FIG. 6.

In this manner, the saturation level calculation unit 52 can appropriately calculate the saturation level for the defective pixel even when there is a low saturation pixel around the defective pixel. Accordingly, it is possible to apply the low saturation pixel correction process also to the defective pixel. As a result, by combining the defective pixel correction process and the low saturation pixel correction process described below, it is possible to obtain a sufficient correction result even when the pixel referred to in the defective pixel correction process is a low saturation pixel and a saturated pixel.

Outline of Low Saturation Pixel Correction Process

Figure 11:
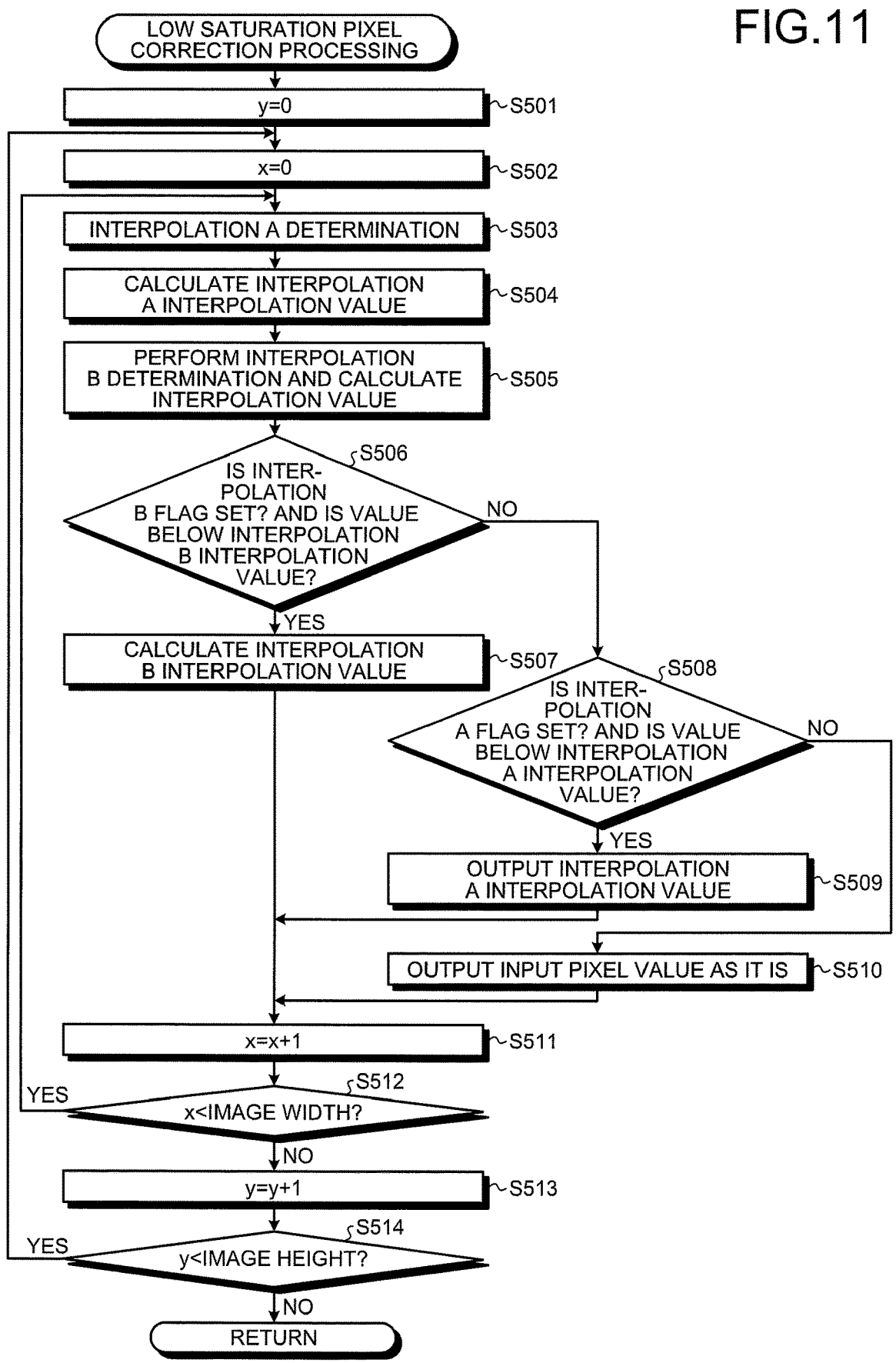
FIG. 11 is a flowchart illustrating an outline of a low saturation pixel correction process in FIG. 6.

Next, details of the low saturation pixel correction process described in Step S103 in FIG. 6 will be described in detail. FIG. 11 is a flowchart illustrating an outline of low saturation pixel correction process, that is, a flowchart of a subroutine executed by the image processing apparatus 30.

As illustrated in FIG. 11, first, the low saturation pixel correction unit 53 resets a counter y (to y=0) indicating the position of the RAW image in the vertical direction (Step S501), and resets a counter x (to x=0) indicating the position of the RAW image in the horizontal direction (Step S502). Incidentally, an upper end of the RAW image is set to 0 in the counter y indicating the position of the RAW image in the vertical direction, and a left end of the RAW image is set to 0 in the counter x indicating the position of the RAW image in the horizontal direction.

Subsequently, the low saturation pixel correction unit 53 performs interpolation A determination (Step S503). Specifically, the low saturation pixel correction unit 53 counts the number of unsaturated pixels (pixel of interest and the pixel of the same color as the pixel of interest when the image sensor has a color filter) among the pixel values of neighboring pixels of the pixel of interest and determines whether the count value is a threshold or less. When the count value is the threshold or less, the low saturation pixel correction unit 53 sets an interpolation A flag.

Figure 12A:
FIG. 12A is a diagram schematically illustrating an outline of interpolation A determination performed by a low saturation pixel correction unit according to the first embodiment of the present disclosure.
Figure 12B:
FIG. 12B is a diagram schematically illustrating an outline of interpolation A determination performed by the low saturation pixel correction unit according to the first embodiment of the present disclosure.
Figure 12C:
FIG. 12C is a diagram schematically illustrating an outline of interpolation A determination performed by the low saturation pixel correction unit according to the first embodiment of the present disclosure.

FIG. 12A is a diagram schematically illustrating a pixel to be referred to in the interpolation A determination performed by the low saturation pixel correction unit 53, in which the pixel of interest is a G pixel. In addition, in FIG. 12A, the pixel at the position described as "1" around the pixel of interest as the center is defined as a same-color reference pixel when the pixel of interest is a G pixel. FIG. 12B is a diagram schematically illustrating a pixel to be referred to in the interpolation A determination performed by the low saturation pixel correction unit 53, in which the pixel of interest is a R pixel or a B pixel. In addition, in FIG. 12B, the pixel at the position described as "1" around the pixel of interest as the center is defined as a same-color reference pixel when the pixel of interest is a R pixel or a B pixel. FIG. 12C is a diagram schematically illustrating pixels referred to in the interpolation A determination performed by the low saturation pixel correction unit 53, in which the image sensor 105 is a monochrome sensor (sequential lighting method using an endoscope). In addition, in FIG. 12C, pixels around the pixel of interest as a center and described with "1" are defined as the reference pixels.

As illustrated in FIG. 12A, when the pixel of interest is a G pixel, the low saturation pixel correction unit 53 counts unsaturated pixels among the reference G pixels of in surrounding range of 5×5 and determines whether the count value is a threshold or less. When the count value is the threshold or less, the low saturation pixel correction unit 53 sets the interpolation A flag. In addition, as illustrated in FIG. 12B, when the pixel of interest is a R pixel or a B pixel, the low saturation pixel correction unit 53 counts unsaturated pixels among the reference pixels having same color as the pixel of interest in the neighboring range of 5×5 and determines whether the count value is a threshold or less. When the count value is the threshold or less, the low saturation pixel correction unit 53 sets the interpolation A flag. Furthermore, as illustrated in FIG. 12C, when the image sensor 105 is a monochrome sensor, the low saturation pixel correction unit 53 counts the unsaturated pixels among the reference pixels of the eight pixels excluding the pixel of interest in a neighboring range of 3×3, and determines whether the count value is a threshold or less. When the count value is the threshold or less, the low saturation pixel correction unit 53 sets the interpolation A flag.

Returning to FIG. 11, Step S504 and subsequent process will be described.

In Step S504, the low saturation pixel correction unit 53 calculates a median (or an average value) of the saturated same-color reference pixels among the pixel values of neighboring pixels of the pixel of interest and defines the calculated value as an interpolation A interpolation value. Specifically, the low saturation pixel correction unit 53 calculates the median (or the average value) of the saturated same-color reference pixels among the same-color reference pixels (for example, pixels denoted as "1") having the same color as the pixel of interest referred to in the above-described interpolation A determination of Step S503, as the interpolation A interpolation value.

Subsequently, the low saturation pixel correction unit 53 performs interpolation B determination and calculates an interpolation value (Step S505). Specifically, first, the low saturation pixel correction unit 53 calculates a median of non-low saturation pixels (pixels having saturation level higher than a predetermined value) out of the same-color reference pixels. More specifically, similarly to the interpolation A determination in Step S503 described above, the low saturation pixel correction unit 53 calculates the median of the non-low saturation pixels (pixels having a saturation level higher than a predetermined value) among the same-color reference pixels (for example, pixels denoted as "1") having the same color as the referenced pixel of interest. Next, when the pixel of interest is a low saturation pixel, the pixel of interest is saturated, and the pixel of interest is the median or less, the low saturation pixel correction unit 53 sets the interpolation B flag and sets the median to the interpolation B interpolation value.

Thereafter, the low saturation pixel correction unit 53 determines whether the interpolation B flag is set to the pixel of interest and whether the pixel value of the pixel of interest is less than the interpolation B interpolation value (Step S506). When the interpolation B flag is set to the pixel of interest and the pixel value of the pixel of interest is less than the interpolation B interpolation value (Step S506: Yes), the low saturation pixel correction unit 53 advances the process to Step S507 described below. When the interpolation B flag is set to the pixel of interest and the pixel value of the pixel of interest is not less than the interpolation B interpolation value (Step S506: No), the low saturation pixel correction unit 53 advances the process to Step S508 described below.

In Step S507, the low saturation pixel correction unit 53 outputs the pixel value of the pixel of interest as the interpolation B interpolation value. After Step S507, the low saturation pixel correction unit 53 advances the process to Step S511 described below.

The low saturation pixel correction unit 53 determines in Step S508 whether the interpolation A flag is set for the pixel of interest and the pixel value of the pixel of interest is less than the interpolation A interpolation value (Step S508). When the interpolation A flag is set and the pixel value of the pixel of interest is less than the interpolation A interpolation value (Step S508: Yes), the low saturation pixel correction unit 53 outputs the pixel value of the pixel of interest as the interpolation A interpolation value (Step S509). After Step S509, the low saturation pixel correction unit 53 proceeds to Step S511 described below.

In Step S508, when the interpolation A flag is set for the pixel of interest and the pixel value of the pixel of interest is not less than the interpolation A interpolation value (Step S508: No), the low saturation pixel correction unit 53 outputs the pixel value of the pixel of interest as it is as an input pixel value (Step S510). After Step S510, the low saturation pixel correction unit 53 advances the process to Step S511 described below.

In Step S511, the low saturation pixel correction unit 53 increments the counter x (x=x+1) indicating the position of the RAW image in the horizontal direction (Step S511), and judges whether the counter x is smaller than the image width of the RAW image (Step S512). When the counter x is smaller than the image width of the RAW image (Step S512: Yes), the low saturation pixel correction unit 53 returns to the above-described Step S503. When the counter x is not smaller than the image width of the RAW image (Step S512: No), the low saturation pixel correction unit 53 proceeds to Step S513.

Subsequently, the low saturation pixel correction unit 53 increments the counter y (y=y+1) indicating the position of the RAW image in the vertical direction (Step S513), and determines whether the counter y is smaller than the image height of the RAW image (Step S514). When the counter y is smaller than the image height of the RAW image (Step S514: Yes), the low saturation pixel correction unit 53 returns the process to the above-described Step S502. When the counter y is not smaller than the image height of the RAW image (Step S514: No), the low saturation pixel correction unit 53 finishes the current process (the subroutine) and returns the process to the main routine of FIG. 6.

In this manner, by performing the low saturation pixel correction process, the low saturation pixel correction unit 53 can achieve sufficient image quality even under the situation where there is a low saturation pixel.

According to the first embodiment of the present disclosure described above, by performing the low saturation pixel correction process, it is possible to achieve sufficient image quality even under the situation where there is a low saturation pixel.

Second Embodiment

Next, a second embodiment of the present disclosure will be described. An imaging system according to the second embodiment has the same configuration as the imaging system 1 according to the above-described first embodiment, except that the image processing apparatus executes defective pixel correction process and saturation level calculation process in a different manner. Hereinafter, defective pixel correction process and saturation level calculation process executed by the image processing apparatus according to the second embodiment will be described. A same reference sign will be given to the configuration identical to the configuration of the imaging system 1 according to the above-described first embodiment, and description for this will be omitted.

Defective Pixel Correction Process

Figure 13:
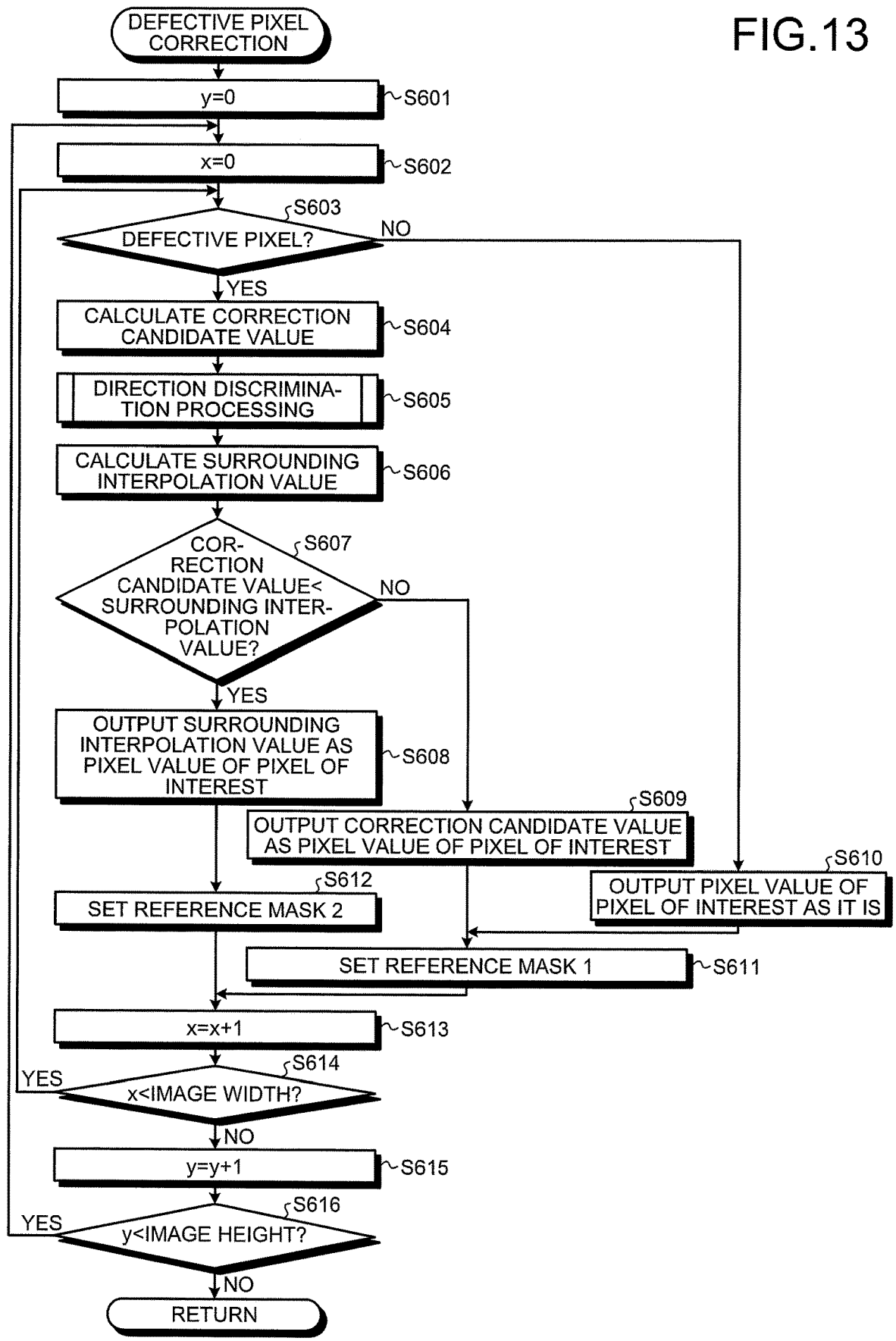
FIG. 13 is a flowchart illustrating an outline of defective pixel correction process executed by an image processing apparatus according to a second embodiment of the present disclosure.

FIG. 13 is a flowchart illustrating an outline of defective pixel correction process executed by the defective pixel correction unit 51 according to the second embodiment of the present disclosure. Steps S601 to S610 in FIG. 13 respectively correspond to Steps S201 to S210 in FIG. 7 described above.

In Step S611, the defective pixel correction unit 51 sets a reference mask 1 for the pixel of interest.

Figures 14A, 14B, 14C:
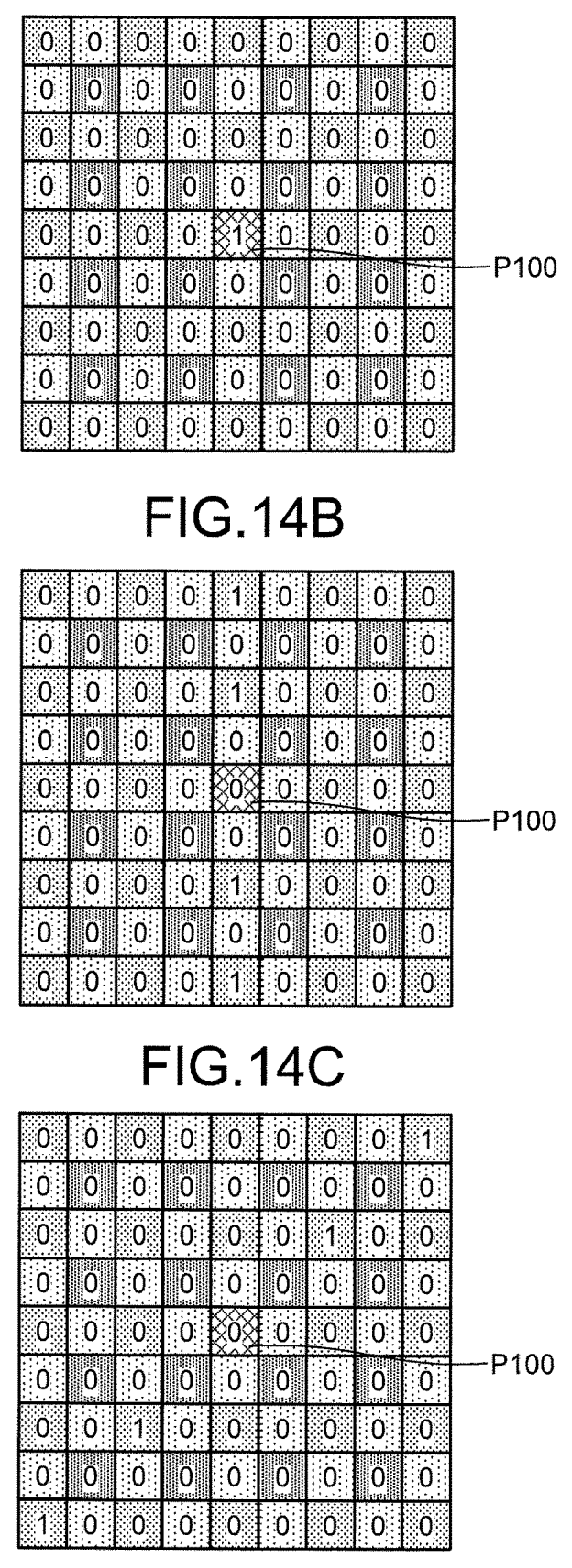

FIG. 14A is a diagram illustrating an example of a reference mask referred to by the defective pixel correction unit 51. FIG. 14A illustrates a reference mask when the defective pixel correction unit 51 does not use neighboring pixels. In addition, FIG. 14A illustrates a case where an R pixel is used as the pixel of interest. Furthermore, the reference mask illustrated in FIG. 14A is a mask to be applied to a Bayer array similar to the above-described FIG. 9A.

As illustrated in FIG. 14A, a mask is set such that the pixel of interest P100 alone is set to "1", while the other pixels are set to "0". The size of the mask is set to 9×9 as illustrated in FIG. 14A, for example. After Step S611, the image processing apparatus 30 advances the process to Step S613 described below.

In Step S612, the defective pixel correction unit 51 sets a reference mask 2 for a pixel of interest (x, y).

FIGS. 14B to 14E are diagrams illustrating examples of the reference mask referred to by the defective pixel correction unit 51. FIG. 14B illustrates a reference mask when the defective pixel correction unit 51 uses neighboring pixels and refers to the vertical direction. FIG. 14C illustrates a reference mask when the defective pixel correction unit 51 uses neighboring pixels and refers to the diagonal direction. FIG. 14D illustrates a reference mask when the defective pixel correction unit 51 uses neighboring pixels and refers to the horizontal direction. FIG. 14C illustrates a reference mask when the defective pixel correction unit 51 uses neighboring pixels and refers to the diagonal direction.

As illustrated in FIGS. 14B to 14E, the mask is set such that the pixel referred to by the neighboring interpolation value calculation in Step S606 described above is set to "1" while the other pixels are set to "0". The size of the mask is set to 9×9 as illustrated in FIGS. 14B to 14E, for example. In a case of calculating a weighted average of the neighboring pixels in the calculation of the neighboring interpolation value for the defective pixel correction, the defective pixel correction unit 51 may set the weight instead of "0" or "1" as the value of the reference mask. With this method of setting the weight as the value of the reference mask, it is possible in the saturation level calculation to easily refer to the weight used in the defective pixel correction. After Step S612, the image processing apparatus 30 proceeds to Step S613 described below.

Steps S613 to S616 correspond to Steps S211 to S214 in above-described FIG. 7, respectively. After Step S616, the image processing apparatus 30 returns the process to the main routine in FIG. 6.

Saturation Level Calculation Process

Figure 15:
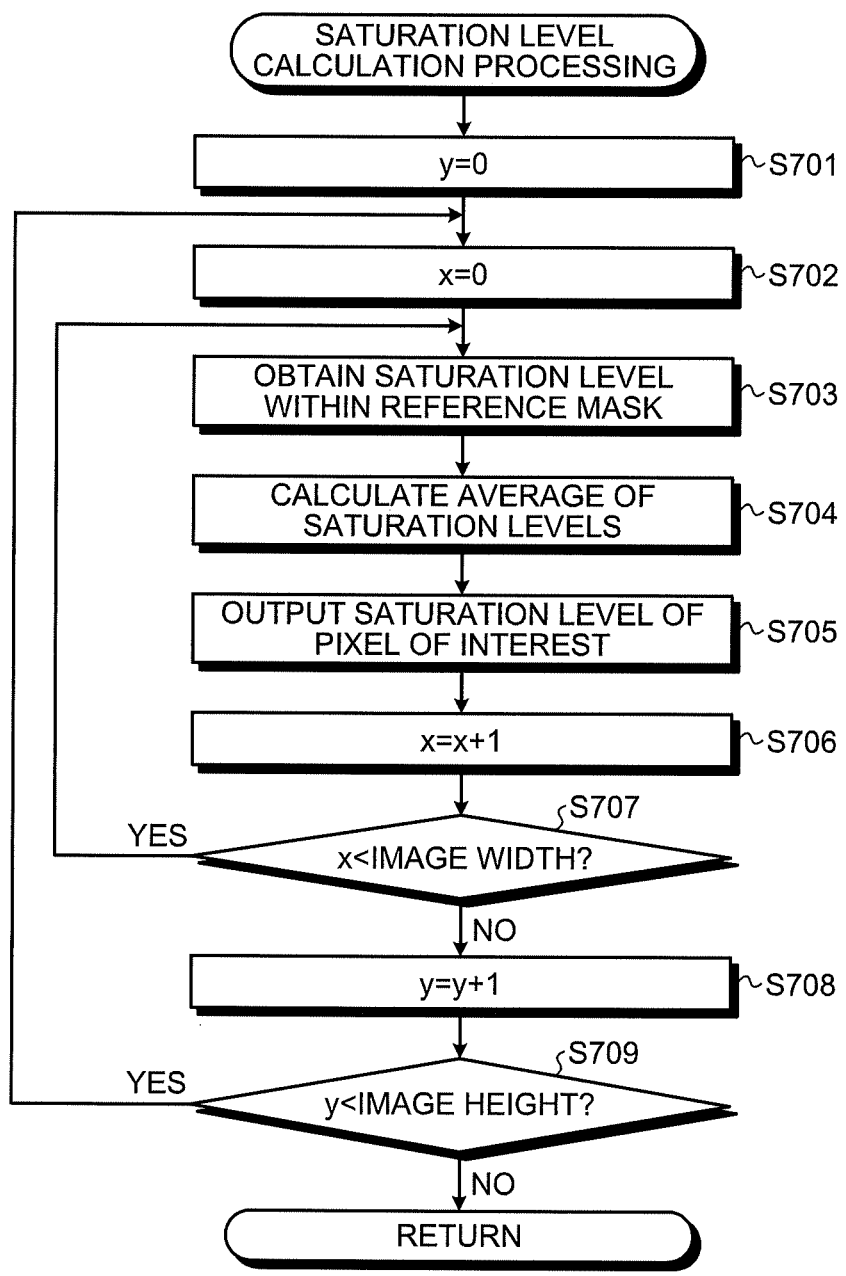
FIG. 15 is a flowchart illustrating an outline of saturation level calculation process executed by the image processing apparatus according to the second embodiment of the present disclosure.

FIG. 15 is a flowchart illustrating an outline of saturation level calculation process executed by the saturation level calculation unit 52 according to the second embodiment of the present disclosure. Steps S701 and S702 in FIG. 15 correspond to Steps S401 and S402 in above-described FIG. 10, respectively.

In Step S703, the saturation level calculation unit 52 obtains a saturation level for the pixel referred to by the reference mask (reference mask corresponding to the pixel of interest (x, y) set in Step S611 or Step S612).

Subsequently, the saturation level calculation unit 52 calculates an average of the saturation levels of the pixels used for defective pixel correction in the reference mask (Step S704). In this case, the saturation level calculation unit 52 calculates the saturation level by the same method as the method used in calculation in the defective pixel correction.

For example, when the weighted average is applied in accordance with the distance from the center in the calculation of the neighboring interpolation value for the defective pixel correction, the saturation level calculation unit 52 uses the weighted average in a similar manner to calculate an average of the saturation levels of the pixels used for the defective pixel correction. Alternatively, the saturation level calculation unit 52 may calculate a weighted average value of the saturation levels of neighboring pixels (reference pixels) of the pixel of interest being a defective pixel.

Thereafter, the saturation level calculation unit 52 outputs the average of the saturation levels as the saturation level of the pixel of interest (Step S705). After Step S705, the image processing apparatus 30 advances the process to Step S706 described below.

Steps S706 to S709 correspond to Steps S408 to S411 in above-described FIG. 10, respectively. After Step S411, the image processing apparatus 30 returns the process to the main routine in FIG. 6.

In this manner, the saturation level calculation unit 52 calculates the saturation level of the pixel of interest by using the reference mask created in accordance with the pixel used in the defective pixel correction and the saturation level of the pixel used in the defective pixel correction. This makes it possible to calculate the saturation level with higher accuracy corresponding to the defective pixel correction method.

According to the second embodiment of the present disclosure described above, it is possible to calculate the saturation level with higher accuracy corresponding to the defective pixel correction method. Accordingly, by performing low saturation pixel correction process, it is possible to achieve sufficient image quality even under the situation where there is a low saturation pixel.

Third Embodiment

Next, a third embodiment of the present disclosure will be described. An imaging system according to the third embodiment has a configuration and process executed by image processing apparatus that is different from the case of the imaging system 1 according to the above-described first embodiment. Hereinafter, the configuration of the imaging system according to the third embodiment will be described, and thereafter process executed by the image processing apparatus according to the third embodiment will be described. A same reference sign will be given to the configuration identical to the configuration of the imaging system 1 according to the above-described first embodiment, and description for this will be omitted.

Configuration of Imaging System

Figure 16:
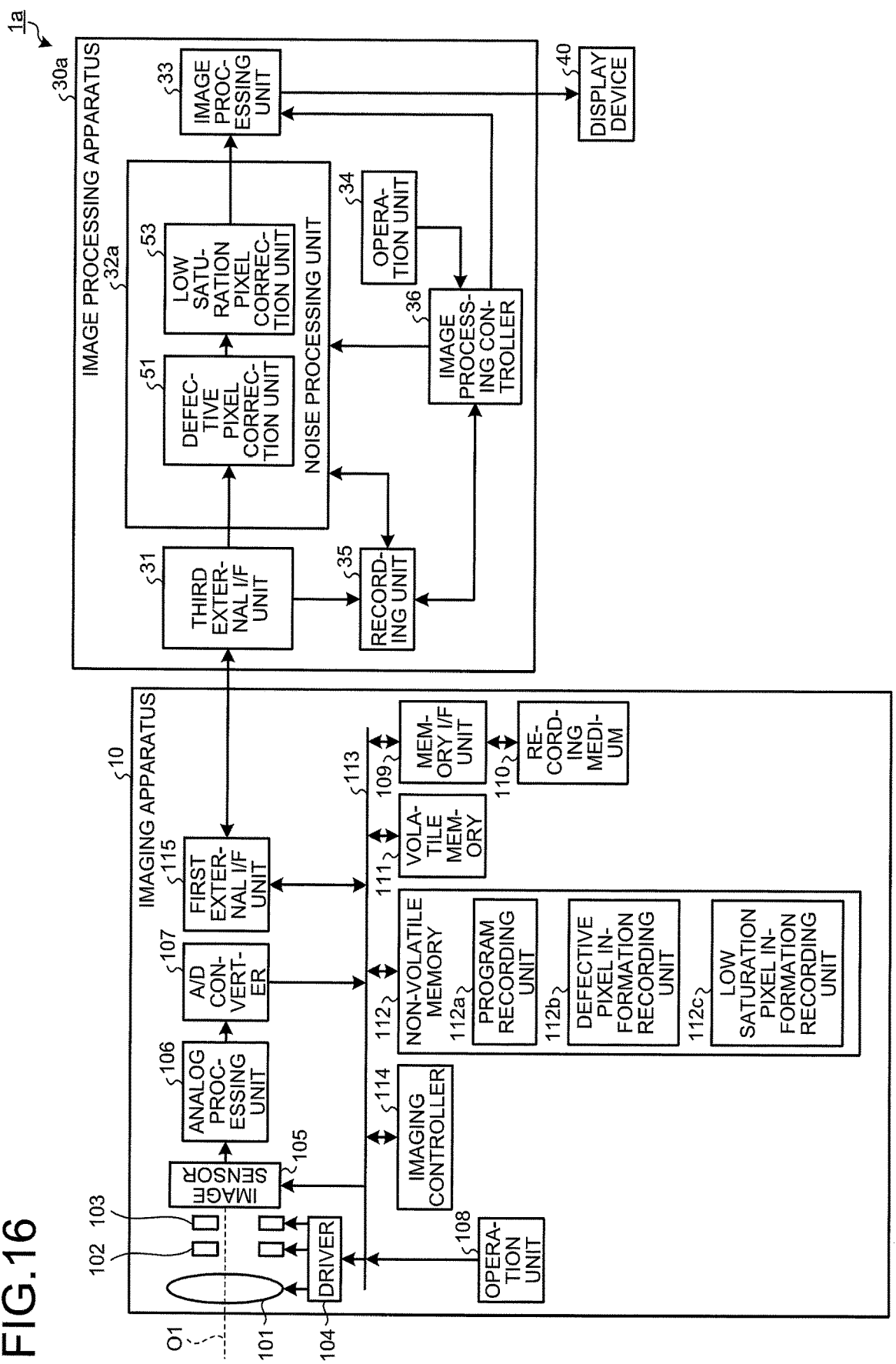
FIG. 16 is a block diagram schematically illustrating a configuration of an imaging system according to a third embodiment of the present disclosure.

FIG. 16 is a block diagram schematically illustrating a configuration of an imaging system according to the third embodiment of the present disclosure. An imaging system 1*a* illustrated in FIG. 16 includes an image processing apparatus 30*a* in place of the image processing apparatus 30 of the imaging system 1 according to the first embodiment described above. The image processing apparatus 30*a* includes a noise processing unit 32*a* in place of the noise processing unit 32 of the image processing apparatus 30 according to the first embodiment described above. The noise processing unit 32*a* includes a defective pixel correction unit 51 and a low saturation pixel correction unit 53.

Process in Image Processing Apparatus

Figure 17:
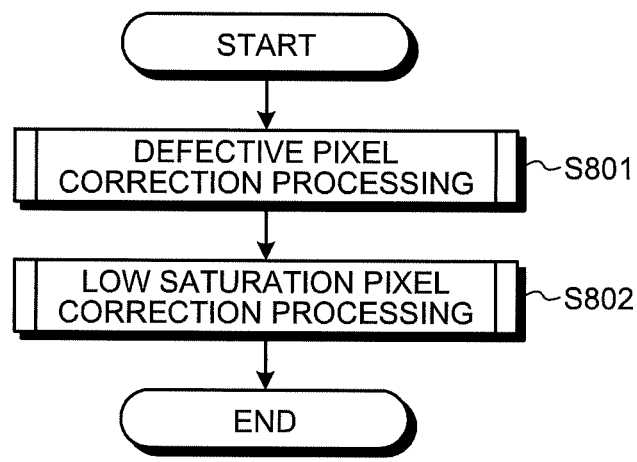
FIG. 17 is a flowchart illustrating an outline of process executed by an image processing apparatus according to the third embodiment of the present disclosure.

Next, a process executed by the image processing apparatus 30*a* will be described. FIG. 17 is a flowchart illustrating an outline of a noise process executed by the image processing apparatus 30*a*, that is, a flowchart of a main routine executed by the image processing apparatus 30*a*. Steps S801 and S802 in FIG. 17 correspond to Steps S101 and S103 in above-described FIG. 6, respectively.

In this embodiment, the low saturation pixel information in the low saturation pixel information recording unit 112*c* includes the saturation level for the defective pixel that has been preliminarily calculated. In Step S802, on the basis of the low saturation pixel information that is obtained by the third external I/F unit 112*c* from the low saturation pixel information recording unit and includes the preliminarily calculated saturation level for the above described defective pixel, the low saturation pixel correction unit 53 corrects the saturation level of the low saturation pixel so that a pixel value of the low saturation pixel becomes similar to the pixel values of the neighboring pixels of the low saturation pixel, when the low saturation pixel is saturated. When the low saturation pixel is not saturated, the low saturation pixel correction unit 53 outputs the pixel value of the low saturation pixel as it is.

Additionally, the low saturation pixel information in the low saturation pixel information recording unit 112*c* includes the saturation level of the pixel that undergoes the correction for the defective pixel, the saturation level having been preliminarily calculated in consideration of defective pixel correction by the defective pixel correction unit 51. In Step S801, the defective pixel correction unit 51 corrects the defective pixel on the basis of the low saturation pixel information that is obtained by the third external I/F unit 31 from the low saturation pixel information recording unit 112*c* and includes the preliminarily calculated saturation level for the corrected pixel.

In Step S801, the defective pixel correction unit 51 performs interpolation by using the pixel value in the direction having the highest correlation as a result of the direction discrimination in the defective pixel correction process. Therefore, it is preferable that the saturation level is also a saturation level corresponding to the direction. However, the direction discrimination result depends on the situation, leading to a difficulty in obtaining it beforehand. Therefore, it is also possible to allow an external device (for example, an apparatus having a function of the saturation level calculation unit 52 in the first and second embodiments) to use the saturation level for the pixel used in the interpolation in individual directions to calculate the saturation level for the defective pixel in individual directions, and then record the smallest value among the plurality of calculated saturation levels in the low saturation pixel information recording unit 112*c*, as the saturation level of the defective pixel. Specifically, the low saturation pixel information recording unit 112*c* calculates four saturation levels by using the saturation levels of the pixels having "1" in individual directions in FIGS. 14A to 14E described above, and records the lowest saturation level among the four saturation levels as the saturation level of the defective pixel. Alternatively, the low saturation pixel information recording unit 112*c* may calculate the saturation level in individual directions by the method similar to the interpolation in individual directions, and record the saturation level in association with the direction. In this case, the low saturation pixel correction unit 53 may select the saturation level in the corresponding direction on the basis of the direction discrimination result, and use the selected saturation level as the saturation level of the defective pixel.

According to the third embodiment of the present disclosure described above, by performing the low saturation pixel correction process, it is possible to achieve sufficient image quality even under the situation where there is a low saturation pixel.

Furthermore, according to the third embodiment of the present disclosure, with the use of the low saturation pixel information in which the saturation level of the defective pixel has been calculated and recorded beforehand, it is possible to achieve a sufficient image quality with a small calculation amount at the time of correction.

Other Embodiments

The present disclosure is not limited to the above-described embodiments, but various modifications and further applications are available within the scope of the present disclosure. For example, besides the imaging apparatus used in the description of the present disclosure, the present disclosure can be applied to any apparatus capable of shooting an image of a subject such as a mobile apparatus having an image sensor of a mobile phone or a smartphone or an imaging apparatus that images the subject by using an optical device such as a video camera, an endoscope, a surveillance camera, or a microscope.

Furthermore, in the present disclosure, the defective pixel information recording unit and the low saturation pixel information recording unit are provided in the imaging apparatus. Alternatively, however, these units may be provided in the above-described image processing apparatus, the lens unit, the endoscope main body, or the like. Moreover, the defective pixel information recording unit and the low saturation pixel information recording unit may be provided in a server capable of bidirectional communication via a network, thereby obtaining Random Telegraph Signal (RTS) noise information via the network.

Furthermore, in the present disclosure, the image processing apparatus of the present disclosure may be provided in a control apparatus (processor) connected with an endoscope including an imaging apparatus at a distal end portion of an insertion portion insertable into a subject.

Furthermore, in the present disclosure, each of the defective pixel correction unit and the low saturation pixel correction unit is provided in the image processing apparatus. However, it is sufficient that at least one of these is provided.

Moreover, the present disclosure is applicable to image data other than the image data used for display and recording. For example, the present disclosure is applicable to the image data in an OB area, and image data in an area outside the image circle, with no optical design assurance.

Moreover, in the description of the flowcharts for the operations described above in the present specification, terms such as "first", "next", "subsequently", and "thereafter" are used to describe operation for convenience. These do not denote, however, that the operations need to be performed in this order.

Moreover, the processes performed by the image processing apparatus in the above-described embodiments, that is, any of the processes illustrated in the flowcharts may be recorded as a program that can be executed by a control unit such as a CPU. In addition, it is possible to distribute by storing in a recording medium of the external recording device, such as memory cards (ROM card, RAM card, etc.), a magnetic disk (floppy disk (registered trademark), hard disk, etc.), an optical disc (CD-ROM, DVD, etc.), or a semiconductor memory. The control unit such as a CPU reads the program recorded in the recording medium of the external recording device and controls the operation by the read program to execute the above-described process.

Moreover, note that the present disclosure is not limited to the above-described embodiments and modifications just as they are, but can be embodied by modifying the components without departing from the scope of the disclosure at a stage of implementation of the disclosure. Furthermore, a plurality of components disclosed in the above-described embodiments may be appropriately combined to form various embodiments. For example, some components may be omitted from the all the components described in the embodiments and the modifications. Furthermore, the components described in each of the embodiments and modifications may be appropriately combined with each other.

Moreover, a term used at least once in the specification or the drawings, associated with another term having a broader or similar meaning, may be substituted by the another term anywhere in the specification and the drawings. In this manner, various modifications and further application may be implemented within a scope that does not depart from the present disclosure.

According to the present disclosure, it is possible to accurately process a defective pixel even when there is a low saturation pixel around the pixel of interest.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus that processes noise resulting from a defective pixel, included in image data generated by an image sensor including a plurality of pixels two-dimensionally arranged to receive light from outside and generate a signal according to an amount of received light and including a plurality of read-out circuits that read out the signal as a pixel value, the image processing apparatus comprising:
a processor comprising hardware, wherein the processor is configured to:
obtain the image data generated by the image sensor and position information of the defective pixel;
correct the signal from the defective pixel included in the image data on the basis of the position information;
perform a low saturation pixel correction process on the image data in which the signal from the defective pixel has been corrected, on the basis of a preliminarily calculated saturation level of each of the plurality of pixels, the low saturation pixel correction process correcting a low saturation signal from a low saturation pixel having a saturation level lower than the other pixels; and
calculate the saturation level of the defective pixel corrected.

2. The image processing apparatus according to claim 1, wherein the processor is configured to:
correct the defective pixel with reference to a pixel value of a pixel around the defective pixel corresponding to the position information, and
calculate the saturation level on the basis of a reference range of pixels referred to when the defective pixel is corrected.

3. The image processing apparatus according to claim 2, wherein the processor is configured to determine a range of pixels referred to when the defective pixel is corrected, as the reference range of pixels.

4. The image processing apparatus according to claim 2, wherein the processor is configured to:
use the pixel value of the pixel around the defective pixel corresponding to the position information to interpolate the defective pixel so as to correct the noise; and
determine a range of pixels used for interpolation when the defective pixel is corrected, as the reference range.

5. The image processing apparatus according to claim 2, wherein the processor is configured to calculate a lowest saturation level in the pixels within the reference range, as the saturation level of the defective pixel.

6. The image processing apparatus according to claim 2, wherein the processor is configured to calculate a weighted average value of the saturation level in the pixels within the reference range, as the saturation level of the defective pixel.

7. The image processing apparatus according to claim 1, wherein the saturation level corresponding to the defective pixel is a lowest saturation level among the saturation levels in reference pixels around a pixel of interest, and
wherein the processor is configured to use the pixel values of reference pixels around the defective pixel corresponding to the position information to interpolate the defective pixel so as to correct the noise.

8. The image processing apparatus according to claim 1, wherein the saturation level corresponding to the defective pixel is a weighted average value of saturation levels in reference pixels around a pixel of interest, and
wherein the processor is configured to use the pixel values of the pixels around the defective pixel corresponding to the position information to interpolate the defective pixel so as to correct the noise.

9. The image processing apparatus according to claim 1, wherein a defect of the defective pixel is any of a white blemish, a black blemish, or blinking defect noise.

10. The image processing apparatus according to claim 1, wherein, when the pixel value of the defective pixel corrected is the saturation level or more, the processor is configured to correct the pixel value of the defective pixel by using the pixel value of a neighboring pixel of the defective pixel.

11. The image processing apparatus according to claim 1, wherein, when the pixel value of the defective pixel corrected is the saturation level or more, the processor is configured to correct the pixel value of the defective pixel corrected so as to decrease a difference between the pixel value of the defective pixel and the pixel value of a neighboring pixel of the defective pixel.

12. An image processing method executed by an image processing apparatus that processes noise resulting from a defective pixel, included in image data generated by an image sensor including a plurality of pixels two-dimensionally arranged to receive light from outside and generate a signal according to the amount of received light and including a plurality of read-out circuits that reads out the signal as a pixel value, the image processing method comprising:
obtaining the image data generated by the image sensor and position information of the defective pixel;
correcting the signal from the defective pixel included in the image data on the basis of the position information;
performing a low saturation pixel correction process on the image data in which the signal from the defective pixel has been corrected by the correcting, on the basis of a preliminarily calculated saturation level of each of the plurality of pixels, the low saturation pixel correction process correcting a low saturation signal from a low saturation pixel having a saturation level lower than the other pixels; and
calculating the saturation level of the defective pixel corrected by the correcting.

13. A non-transitory computer readable recording medium storing a program that causes an image processing apparatus that processes noise resulting from a defective pixel, included in image data generated by an image sensor including a plurality of pixels two-dimensionally arranged to receive light from outside and generate a signal according to the amount of received light and including a plurality of read-out circuits that reads out the signal as a pixel value, to execute processing, the processing comprising:
obtaining the image data generated by the image sensor and position information of the defective pixel;
correcting the signal from the defective pixel included in the image data on the basis of the position information;
performing a low saturation pixel correction process on the image data in which the signal from the defective pixel has been corrected by the correcting, on the basis of a preliminarily calculated saturation level of each of the plurality of pixels, the low saturation pixel correction process correcting a low saturation signal from a low saturation pixel having a saturation level lower than the other pixels; and
calculating the saturation level of the defective pixel corrected by the correcting.

* * * * *